(12) United States Patent
Callard et al.

(10) Patent No.: US 9,386,126 B2
(45) Date of Patent: Jul. 5, 2016

(54) SYSTEM AND METHOD FOR HIERARCHICAL COMPRESSION

(71) Applicant: Huawei Technologies Co., Ltd., Shenzhen (CN)

(72) Inventors: Aaron James Callard, Ottawa (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 14/268,815

(22) Filed: May 2, 2014

(65) Prior Publication Data

US 2015/0319268 A1    Nov. 5, 2015

(51) Int. Cl.
*H04L 29/06* (2006.01)
*H04L 29/08* (2006.01)

(52) U.S. Cl.
CPC .............. *H04L 69/04* (2013.01); *H04L 65/607* (2013.01); *H04L 67/10* (2013.01)

(58) Field of Classification Search
CPC .................................................. H04L 29/08072
USPC ............... 709/231, 247; 341/50, 51; 382/176, 382/233, 243
See application file for complete search history.

(56) References Cited

U.S. PATENT DOCUMENTS

2001/0054131 A1* 12/2001 Alvarez, II .............. H03M 7/30 711/105
2007/0237176 A1* 10/2007 Bartlett ............... H04L 12/2856 370/468

FOREIGN PATENT DOCUMENTS

KR    20040070894 A  *  8/2004  ............. H03M 7/30

OTHER PUBLICATIONS

"Data Compression"—Princeton University, Oct. 2007 https://www.cs.princeton.edu/~rs/AlgsDS07/20Compression.pdf.*
Spring, N., et al. "A Protocol-Independent Technique for Eliminating Redundant Network Traffic," ACM SIGCOMM Computer Communication Review, vol. 30, No. 4, ACM, Sep. 2000.
Zhu, B. et al., "Avoiding the Disk Bottleneck in the Data Domain Deduplication File System," Fast, vol. 8, Feb. 2008, pp. 1-14.

* cited by examiner

*Primary Examiner* — Randy Scott
(74) *Attorney, Agent, or Firm* — Slater Matsil, LLP

(57)    ABSTRACT

Hierarchical compression includes the contemporaneous implementation of link-layer and higher-layer compression on data flowing over a link. Hierarchical compression can be achieved by configuring network nodes positioned at the link-layer to recognize higher-layer compression symbols embedded in incoming data streams, and to adapt link-layer compression to compensate for those higher-layer compression symbols. One technique for adapting link-layer compression is to perform data chunking in-between higher-layer compression symbols. This may reduce the likelihood that higher-layer compression symbols will interfere with the network nodes ability to identify redundant data chunks at the link-layer. Another technique for adapting link-layer compression is to define the HASH algorithm in such a way that the hash of a data string renders the same hash value as the hash of the higher layer compression symbol corresponding to the data string.

33 Claims, 18 Drawing Sheets

| PARAMETER NAME | DEVICE AFFECTED | FUNCTION | EXAMPLE |
| --- | --- | --- | --- |
| DATA CONSIDERED | BOTH | WHAT DATA TYPE DOES THIS PAIR ACT UPON | HTML, VIDEO |
| ALGORITHM | BOTH | WHAT ALGORITHM IS IT USING FOR COMPRESSION | DEFLATE, RE, ETC |
| ALGORITHM PARAMETERS | BOTH | PARAMETERS FOR THE PARTICULAR ALGORITHM | CHUNK SIZE FOR RE, COMPRESSION LEVEL OR DICTIONARY SIZE FOR DEFLATE, ETC |
| FLOWS CONSIDERED | COMPRESSOR | WHICH FLOWS (PORT, IP, ETC) ARE COMPRESSED PASSING THROUGH THESE LINKS, WHICH FLOWS ARE IGNORED | IP DESTINATION X, Y, Z |
| CONNECTION BETWEEN NODES | BOTH | HOW DOES DATA TRAVEL BETWEEN THE COMPRESSOR AND DECOMPRESSOR | TCP TUNNELING, IP TUNNELING, NO TUNNELING, ACK'D WITHOUT RETRANSMISSION, ETC |
| PRIORITIZATION WITH OTHER COMPRESSION LAYERS | BOTH | HOW SHOULD THIS COMPRESSION LINK INTERACT WITH OVERLAPPING COMPRESSION LAYERS, i.e. WHICH LINK GETS PRIORITY IN TERMS OF COMPRESSION | APPLY TO LINK A WITHOUT LOSS TO LINK B, APPLY TO LINK A IGNORING IMPACT TO B |
| PROPAGATION OF STATES | DECOMPRESSOR | SHOULD A DECOMPRESSOR WHICH HAS ACCESS TO OTHER FLOWS OF DATA INFORM THE COMPRESSOR OF THIS BY FEEDING BACK THE STATE | FEEDBACK IF LOAD IS LESS THAN X |
| PREDOWNLOADING | COMPRESSOR | SHOULD INFORMATION BE SENT FORWARD WHEN NETWORK LOAD IS LOW | FEEDFORWARD IF LOAD IS LESS THAN X |
| DATA STORAGE PRIORITIZATION | BOTH | WHEN STORING DATA HOW IS THE DATA PRIORITIZED. HOW IS POPULAR CONTENT DIFFERENTIATED FROM UNPOPULAR CONTENT | DATA CONTAINING OBJECT X HAS POPULARITY Y |
| STREAM TO OBJECT DIFFERENTIATION | BOTH | WITHOUT APPLYING DEEP PACKET INSPECTION, HOW ARE THE LINKS TO DIFFERENTIATE THE STREAMS INTO CONCRETE OBJECTS | OBJECT Y IS IN FLOW Z BYTE s1 TO s2 |

FIG. 14

| PARAMETER NAME | DEVICE AFFECTED | FUNCTION | EXAMPLE |
|---|---|---|---|
| DATA CONSIDERED | EGRESS ROUTER | WHAT DATA TYPE DOES THIS PAIR ACT UPON | HTML, VIDEO, PORT NUMBER |
| FLOWS CONSIDERED | EGRESS ROUTER | WHICH FLOWS (PORT, IP, ETC) ARE COMPRESSED PASSING THROUGH THESE LINKS, WHICH FLOWS ARE IGNORED | IP DESTINATION X, Y, Z |
| WHAT TO ADD | EGRESS ROUTER | WHAT INFORMATION IS COLLECTED FOR FLOWS | DATA TYPE ID, OBJECTS BEGINNING AND END, POPULARITY |
| WHERE TO SEND | EGRESS ROUTER | WHERE IS THIS INFORMATION SENT | APPEND TO PACKET, SEND TO CONTROLLER, SEND TO COMPRESSOR X, Y AND Z |

FIG. 15

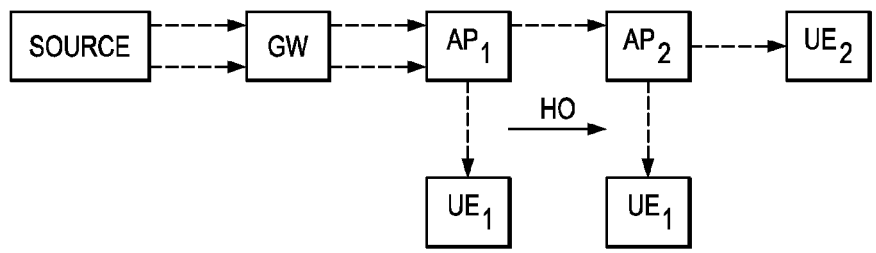

FIG. 16

SYSTEM AND METHOD FOR HIERARCHICAL COMPRESSION

TECHNICAL FIELD

The present invention relates generally to communications, and more specifically, to methods and systems for hierarchical compression.

BACKGROUND

In telecommunications, data de-duplication is a data compression technique that reduces redundancy in data streams by replacing redundant instances of data blocks with compression symbols associated with, or otherwise identifying, earlier instances of the data blocks. One type of data de-duplication scheme uses history table compression symbols that identify a history table entry associated with the data block. More specifically, an original instance of a data block is identified and stored in a history table, and a hash algorithm is applied to two or more data chunks within the data block to obtain hash values for those chunks. The hash values are then stored in a hash table, which associates the hash values with a location of the stored data block in the history table. The hash algorithm is then applied to data chunks of an incoming data stream, and the resulting hash values are compared with the hash table to see if there is a match. If the resulting hash values match an entry in the hash table, then the incoming data block is compared with the stored data block to determine whether they are the same. This comparison may be performed by aligning the corresponding data chunks (e.g., the chunks producing the matching hash values) to see if the data blocks match. If the data blocks match, then the entire incoming data block is substituted for a compression symbol prior to forwarding the data stream to the next-hop to achieve compression. A downstream node performs identical processing (e.g., hashing, storing, etc.), and therefore maintains an identical hash table as the upstream node performing the compression. As a result, the downstream node receiving the compressed data stream simply replaces the compression symbol with the data block to decompress the data stream.

Another type of data de-duplication scheme uses backward reference compression symbols that identify a position of the earlier data block instance within the data stream. In both schemes, the compression symbols are much smaller than the redundant data blocks, and therefore can greatly reduce the volume of information transported over the network, particularly when the same data block is transported many times over.

SUMMARY OF THE INVENTION

Technical advantages are generally achieved, by embodiments of this disclosure which describe methods and systems for hierarchical compression.

In accordance with an embodiment, a method for compressing data is provided. In this example, the method comprises receiving a first compressed data stream and a second compressed data stream at a network node. The second compressed data stream was generated through higher-layer compression of a data stream at an upstream node. The method further includes identifying a first occurrence of a data block in the first compressed data stream, and performing link-layer compression on at least the second compressed data stream to obtain a compressed traffic flow. Performing link-layer compression on at least the second compressed data stream comprises identifying a second occurrence of the data block in the second compressed data stream, and replacing the second occurrence of the data block in the second compressed data stream with a link-layer compression symbol associated with the data block. The method further includes forwarding the compressed traffic flow from the network node to a next hop node on the link. An apparatus for performing this method is also provided.

In accordance with another embodiment, a method for link-layer de-compression is provided. In this example, the method comprises receiving a compressed traffic flow from an upstream network node. The compressed traffic flow carries compressed data that includes at least a first link-layer compression symbol and a first higher-layer compression symbol. The method further comprises performing link-layer de-compression on the compressed traffic flow to obtain a compressed data stream. Performing link-layer de-compression comprises determining that the first link-layer compression symbol is associated with a first data block, and replacing the link-layer compression symbol with the first data block. The higher-layer compression symbol remains in the compressed data after the link-layer de-compression. An apparatus for performing this method is also provided.

In accordance with yet another embodiment, another method for compressing data is provided. In this example, the method includes receiving a compressed data stream that was generated through higher-layer compression of a data stream at an upstream node, identifying higher layer compression symbols in the compressed data stream, and performing data chunking in-between the higher layer compression symbols to obtain one or more data chunks. The data chunks and at least a first one of the higher layer compression symbols are positioned in a compressed data block of the compressed data stream. The method further comprises determining that the one or more data chunks match known data chunks of a known data block, comparing the compressed data block with the known data block to determine if the compressed data block matches the known data block, substituting a link-layer compression symbol for the compressed data block if the compressed data block matches the known data block to obtain a compressed traffic flow, and forwarding the compressed traffic flow from the network node to a next hop node on the link. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 14 illustrates a table of configurable parameters in accordance with an embodiment of this disclosure;

FIG. 15 illustrates another table of configurable parameters in accordance with another embodiment of this disclosure;

FIG. 16 illustrates a diagram of an embodiment wireless network configured for hierarchical compression.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
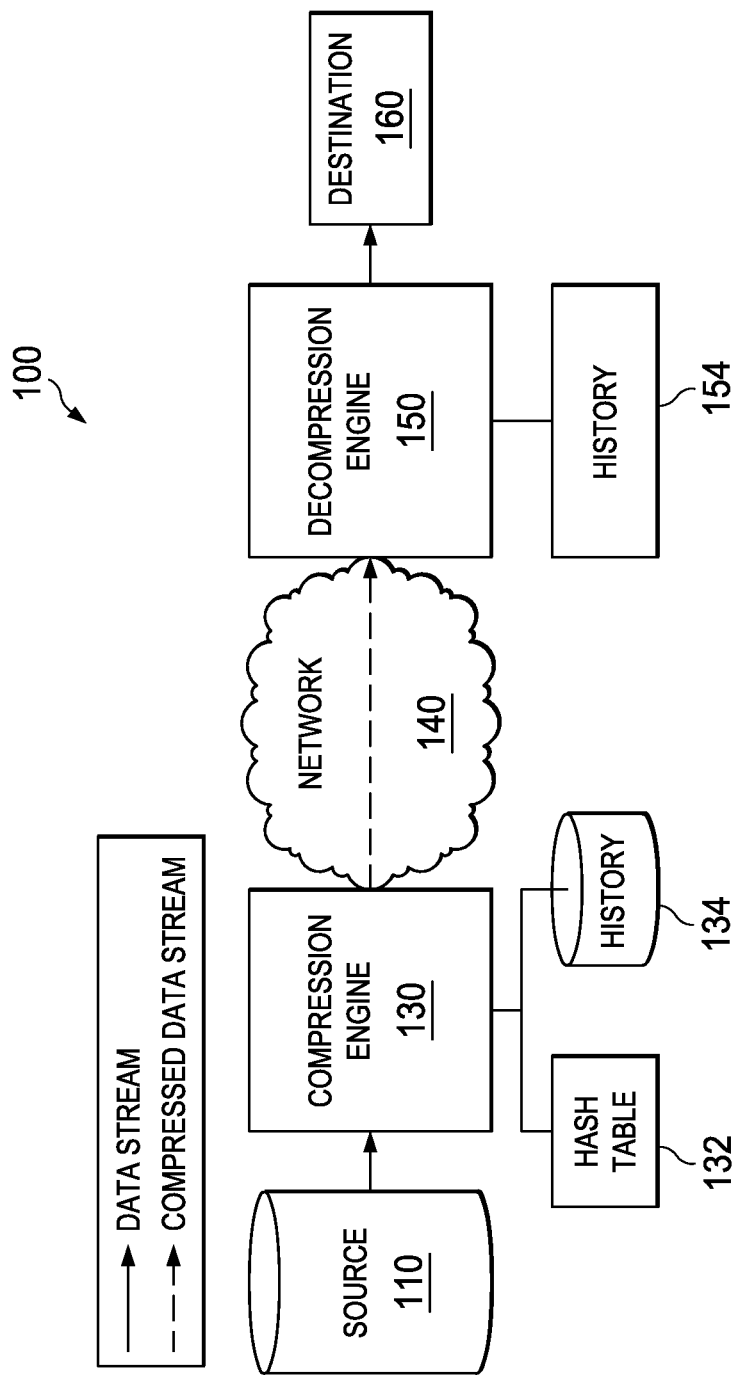
FIG. 1 illustrates a diagram of a data-de-duplication network.

The making and using of embodiments disclosed herein are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Conventional de-duplication techniques perform data compression/de-compression at a single point in the network, such as at the end-points (e.g., source/destination nodes) to achieve end-to-end compression or at intermediate nodes (e.g., border routers) to achieve link-layer compression, but not both. On one hand, end-to-end compression may be efficient for communication sessions in which the last hop is the primary bottleneck, as may be the case when data is being streamed to a mobile device in a wireless network. On the other hand, link-layer compression may achieve greater compression over the provider network through exploitation of inter-stream redundancies. Notably, link-layer compression and higher-layer compression cannot generally be performed on the same media stream (using conventional approaches) because modifying a data string during higher-layer compression will typically prevent that data string from being de-duplicated at the link-layer. For example, assume that a string of data represents a media content that is redundant at the link-layer such that a network node at the link-layer would recognize the string of data as being identical to a known string of data. Further assume that a data block within the string of data represents (for example) an advertisement (e.g., a commercial in a television program) that is redundant at the higher-layer, and is therefore substituted for a higher-layer compression symbol at a source node during higher-layer compression. Substituting the redundant data block for the higher-layer compression symbol modifies the string of data, and generally prevents it from being correlated with the known data string during link-layer compression at the network node. Thus, conventional link-layer compression is generally incapable of being concurrently implemented with higher-layer compression techniques. Accordingly, mechanisms for allowing concurrent implementation of link-layer and higher-layer compression are desired.

Aspects of this disclosure provide hierarchical compression techniques that allow link-layer and higher-layer compression to be implemented contemporaneously. More specifically, network nodes at the link-layer may be configured to recognize higher-layer compression symbols embedded in incoming data streams, and to adapt link-layer compression to compensate for those higher-layer compression symbols. One technique for adapting link-layer compression is to perform data chunking in-between higher-layer compression symbols, which can be achieved by identifying data chunks in an incoming compressed data block as strings of data positioned in-between higher-layer compression symbols in the compressed data block. This may reduce the likelihood that higher-layer compression symbols will interfere with the network nodes ability to identify redundant data chunks at the link-layer. Another technique for adapting link-layer compression is to define the HASH algorithm in such a way that the hash of a data string renders the same hash value as the hash of the higher layer compression symbol corresponding to the data string. This can be achieved by, inter alia, the use of cyclic redundancy checks (CRCs). Yet another technique for adapting link-layer compression is to decompress (and de-embed) higher layer compression symbols prior to link-layer compression. This technique may be somewhat more complex than the other techniques, as the network node may need to have at least some knowledge of the higher layer compression parameters (e.g., history tables, hashing algorithms). Aspects of this disclosure also adapt link-layer compression to avoid interfering with higher-layer compression by embedding higher-layer compression-symbols within link-layer metadata messages when the higher-layer compression-symbols are interspersed within a large redundant block of data. This may allow link-layer compression to be performed without obviating the benefits of end-to-end compression. These and other aspects are explained in greater detail below.

FIG. 1 illustrates a data-de-duplication network 100 comprising a source 110, a compression engine 130, a network 140, a de-compression engine 150, and a destination node 160. The compression/de-compression engines 130, 150 are configured to de-duplicate data in the data stream to reduce the volume of data communicated over the network 140. In some embodiments, data de-duplication is achieved by substituting redundant instances of data blocks with compression symbols associated with stored versions of the data blocks in the history tables 134, 154, which are typically identical to one another. Throughout this disclosure the terms "instance" and "occurrence" are used interchangeably, e.g., the phrase "a first instance of a data block" is synonymous with the phrase "a first occurrence of a data block" in this disclosure. In such instances, the compression engine 130 may identify a redundant data block in the media stream, and replace it with a compression symbol associated with a known data block in the history table 134 to obtain the compressed data stream. The de-compression engine 150 will then recognize the compression symbol upon receiving the compressed data stream, and substitute it for the known data block stored in the history table 154 to decompress the compressed data stream. In other embodiments, the compression/de-compression engines 130, 150 achieve de-duplication by substituting redundant instances of data blocks with compression symbols that identify positions of earlier instances within the data stream.

The compression engines 130 may use hash algorithms to identify redundant instances of a data block in a data stream, in which case the compression engine 130 may maintain a hash table 132. The hash table 132 may store hash value tuples (e.g., two or more hash values) for each known data block, and associate those hash values tuples with the known data block in the history table 134.

Figure 2A:
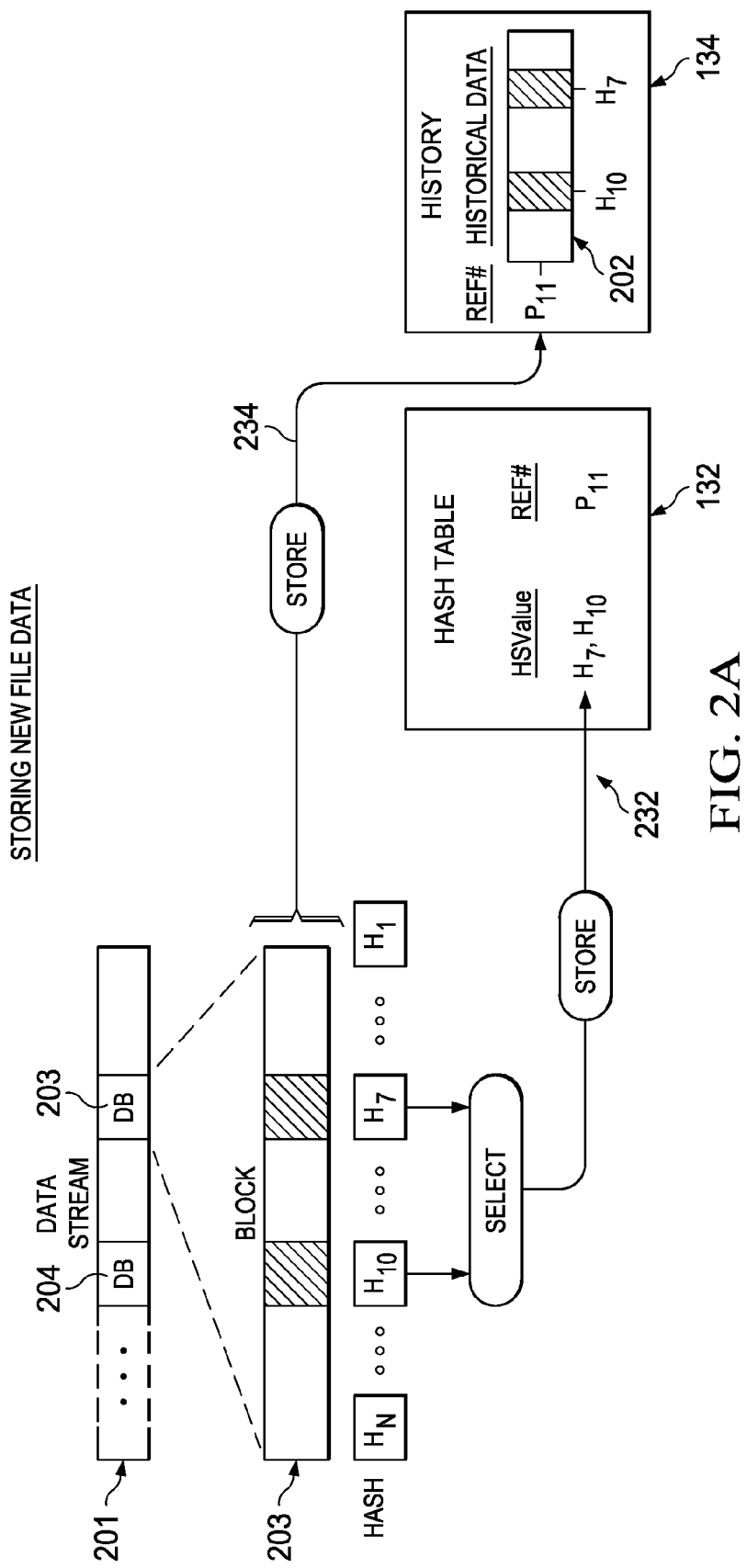
FIGS. 2A-2B illustrate diagrams of sequences for de-duplicating data in a data stream using hash and history tables.
Figure 2B:
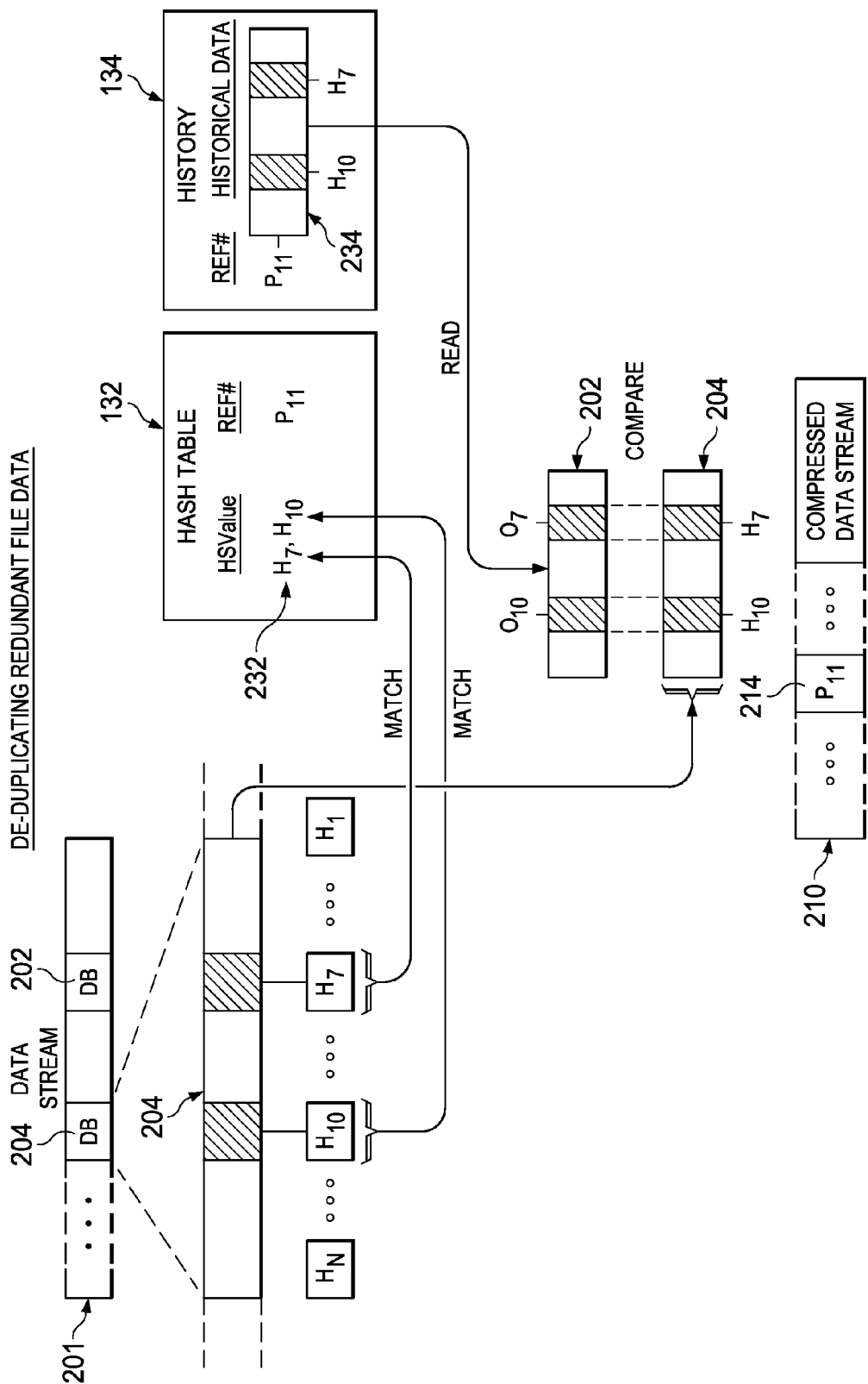

FIGS. 2A-2B illustrate sequences for de-duplicating data in a data stream 201 based on entries in the hash table 132 and the history table 134. More specifically, FIG. 2A illustrates a sequence for adding entries 232, 234 to the hash table 132 and the history table 134 upon receiving an original instance of a data block 202, and FIG. 2B illustrates a sequence for de-duplicating a redundant instance of the data block 204 based on the entries 232, 234 in the hash table 132 and the history table 134. As shown in FIG. 2A, the data block 202 is hashed to obtain hash identifiers $H_1$ through $H_N$ (N is an integer greater than one), of which a hash identifier tuple ($H_7$, $H_{10}$) is selected for identifying redundant instances of the data block 202 during de-duplication. Thereafter, an entry 232 is added to the hash table, and an entry 234 is added to the history table 134. The entry 232 associates the hash identifier tuple ($H_7$, $H_{10}$) with a position ($P_{11}$) of the entry 234 in the history table 134, and the entry 234 associates a compression symbol ($P_{11}$) with the data block 202 (which is known). While this example uses the same reference for the position ($P_{11}$) of the entry 234 and the compression symbol ($P_{11}$), the compression symbol may differ from the history table entry position in some embodiments. Notably, the same hashing/storage function is performed by the de-compression engine 150 such that a similar entry for the data block 202 is stored in the history table 154.

As shown in FIG. 2B, the data block 204 (which is identical to the data block 202) is hashed to obtain hash identifiers $H_1$ through $H_N$, and the hash identifiers $H_7$, $H_{10}$ are matched with the entry 232 in the history table 134 to locate the position ($P_{11}$) of the entry 234 in the history table 134. Thereafter, the block 204 is compared with the block 202 to determine whether they match. In some embodiments, the block 204 is matched to the block 202 by determining whether the data chunks corresponding to the hash identifiers $H_7$, $H_{10}$ properly align. After the block 204 is matched to the block 202, the block 204 is replaced with a metadata message 214 specifying the compression symbol $P_{11}$ to produce the compressed data stream 210. The term "compression symbol" is used loosely throughout this disclosure to refer to any information that is inserted into a data stream for the purpose of achieving compression. Compression symbols may include any symbol associated with an original instance of a data block, such as a history table reference, a backwards reference, a forwards reference, or otherwise. Forwards references may offer performance advantages for lossy compression implementations. During de-compression, the metadata message 214 may be substituted for the data block 202.

Figure 3:
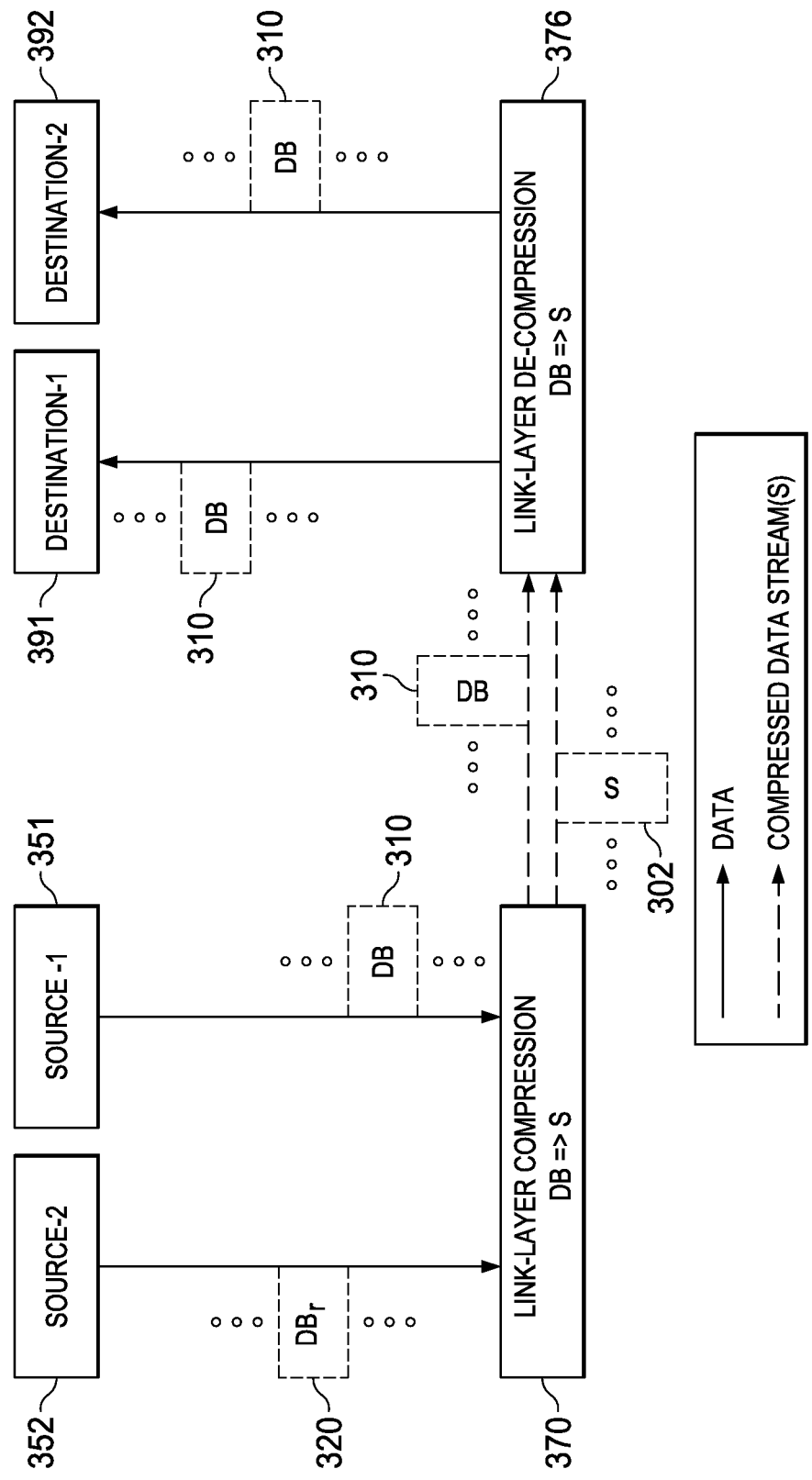
FIG. 3 illustrates a diagram of a network configured to support conventional link-layer data de-duplication.

Conventional de-duplication techniques perform data compression/de-compression at a single point in the network. FIG. 3 illustrates a network 300 configured to support conventional link-layer data de-duplication. As shown, the network 300 includes sources 351, 352, destinations 391, 392, and network nodes 370, 376 configured to perform link-layer compression/de-compression. As shown, the network node 370 receives a first data stream carrying a data block 310 from the source 351, and forwards the first data stream to the network node 376, where it is relayed to the destination 391. The network node 370 also receives a second data stream carrying a redundant data block 320 from the source 252, and performs link-layer compression on the second data stream by replacing the redundant data block 320 with a compression symbol 302 associated with the data block 310. The network node 370 then forwards the compressed data stream to the network node 376, where it is decompressed by substituting a copy of the data block 310 for the compression symbol.

Figure 4:
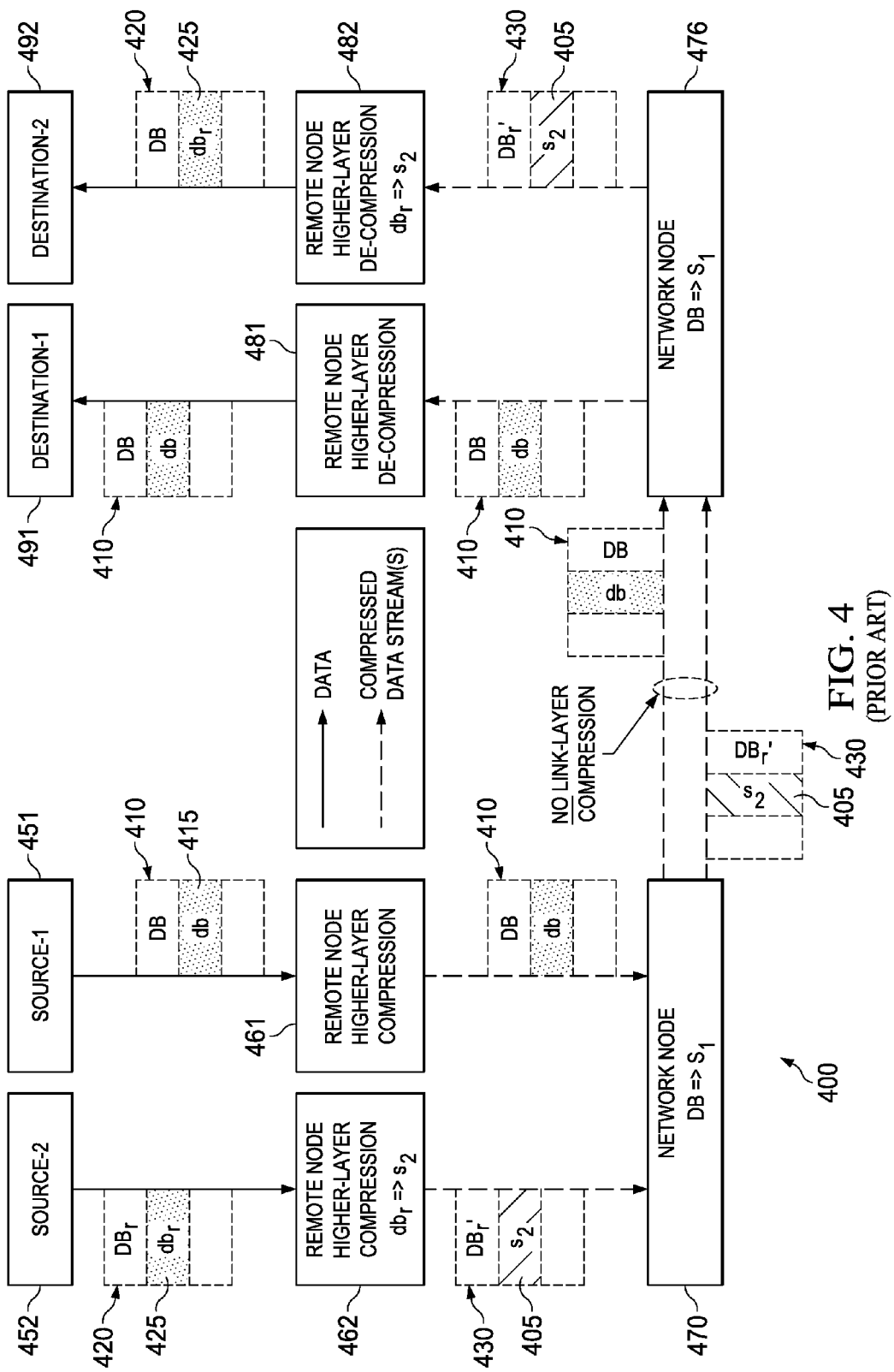
FIG. 4 illustrates a diagram of a network configured to support conventional higher-layer data de-duplication.

FIG. 4 illustrates a network 400 configured to support conventional higher-layer data de-duplication. As shown, the network 400 includes sources 451, 452, destinations 491, 492, remote nodes 461, 462, 481, 482 configured to perform higher-layer compression, and network nodes 470, 476 configured to forward the compressed data streams over a link. In some networks, the remote nodes 461, 462, may be co-located with the respective sources 451, 452, and the remote nodes 481, 482 may be co-located at the destinations 491, 492. The remote node 461 receives a first data stream carrying the data block 410 from the source 451, and performs higher-layer compression on the first data stream to obtain a first compressed data stream. Notably, while the data block 410 includes a data block portion (db) 415, the db 415 is not recognized by the remote node 461 as being redundant, and consequently the data block 410 is not altered during higher-layer compression. The remote node 461 then forwards the first compressed data stream to the network node 470, where it is relayed through the network node 476 to the remote node 481 for higher-layer de-compression. The higher-layer de-compression re-produces the first media stream, which is forwarded from the remote node 481 to the destination 491. Since the data block 410 is not altered during higher-layer compression, the network node 470 and the network node 476 are able to associate the data block 410 with a compression symbol ($S_1$) upon receiving the first compressed data stream.

The remote node 462 receives a second data stream carrying a redundant data block 420 from the source 452, and performs higher-layer compression on the second data stream to obtain a second compressed data stream, after which the remote node 462 forwards the second compressed data stream to the network node 470. Unlike the remote node 461, the remote node 462 recognizes a data block portion (db) 425 in the redundant data block 420 as being redundant, and therefore replaces the db 425 with a higher-layer compression symbol ($s_2$) 405 during higher-layer compression. This modifies the data block 410 into a modified data block 430 (depicted as $DB_r'$) and prevents the network node 470 from correlating the modified data block 430 with the data block 410. Accordingly, no link-layer compression is obtained over the link extending between the network nodes 470 and 476. The second compressed data stream is forwarded from the network node 470 to the remote node 482, where higher-layer de-compression is performed to re-produce the redundant data block 420. The redundant data block 420 is then forwarded to the destination 492.

Notably, loading on the link extending between the network nodes 470 and 476 may be significantly higher than loading on the link extending between the network nodes 370 and 376 due to the inability to achieve link-layer compression in the network 400. Conversely, loading on the links extending between the remote nodes 462, 482 and the network nodes 470, 476 may be significantly lower than loading on the links extending between the sources/destinations 352, 392 and the network nodes 370, 376 due to the higher-layer compression in the network 400.

Aspects of this disclosure provide hierarchical compression techniques that allow network nodes to adapt link-layer compression to compensate for higher-layer compression symbols, thereby allowing link-layer compression to be applied contemporaneously with higher-layer compression. Compression schemes in which higher-layer and link-layer compression techniques are performed on components of a common traffic flow are referred to as hierarchical compression schemes throughout this disclosure. In some embodiments, redundancy elimination techniques provided by this disclosure may use principles described Association for Computing Machinery (ACM) Special Interest Group on Data Communication (SIGCOMM) publication entitled "A Protocol-Independent Technique for Eliminating Redundant Network Traffic," which is hereby incorporated by reference herein as if reproduced in its entirety.

Figure 5:
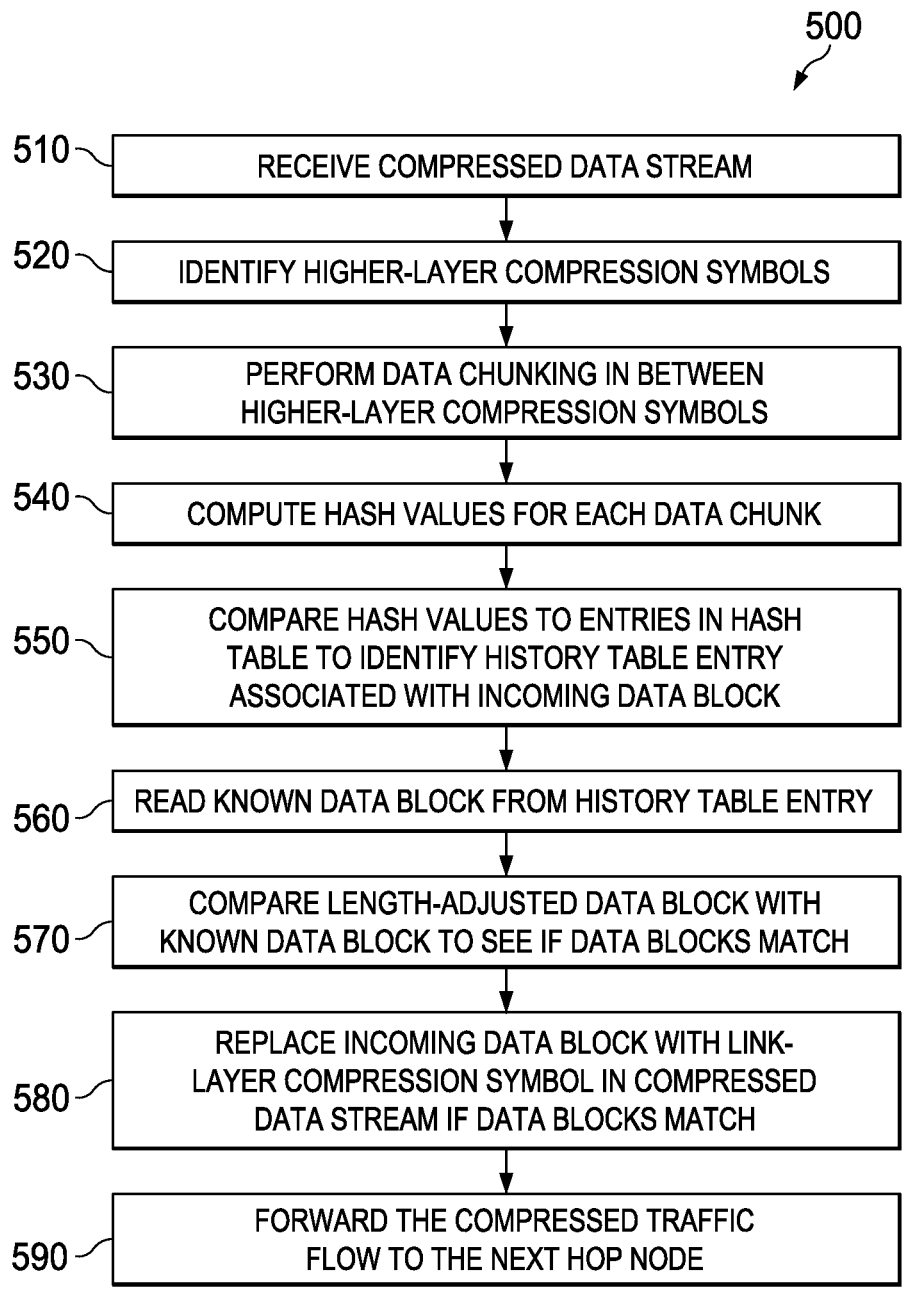
FIG. 5 illustrates a flowchart of an embodiment method for performing link-layer compression.

FIG. 5 illustrates a method 500 for performing link-layer compression, as may be performed by a network node. As shown, the method 500 begins at step 510, where the network node receives a compressed data stream. Next, the method 500 proceeds to step 520, where the network node identifies higher-layer compression symbols. Subsequently, the method 500 proceeds to step 530, where the network node performs data chunking in between higher-layer compression symbols. This may include identifying a data chunk as a string of data positioned in-between consecutive higher-layer compression symbols. Thereafter, the method 500 proceeds to step 540, where the network node computes hash values for each data chunk. The hash values may include a string of multiple high layer hash values, or a combination of hash values. In this disclosure, the terms "data chunk" and "data block" refer to strings of data in a data stream, e.g., media stream, traffic flow, etc. In some embodiments, hash algorithms are described as being applied to data chunks positioned within a data block. This should not be interpreted as implying that a hash algorithm is not ultimately applied to the entire data block, as aspects of this disclosure provide techniques for compensating for compression symbols embedded within redundant data blocks.

Next, the method 500 proceeds to step 550, where the network node compares the hash values with entries in a hash table to identify history table entry associated with incoming data block. In some embodiments, higher layer compression symbols may be embedded in the redundant data block. There are various techniques for compensating for the higher layer compression symbols. One technique is to insert multiple link layer compression symbols for strings of data in-between the embedded higher layer compression symbols. In this manner, the higher-layer compression symbols are interleaved with the link layer compression symbols. Another technique is to de-embed the higher-layer compression symbols from the incoming data block. One technique for de-embedding the higher-layer compression symbols is to define a HASH algorithm that produces the same hash value when applied to a data string as when applied to a higher layer compression symbol corresponding to the data string. This could be achieved by, inter alia, the use of cyclic redundancy checks (CRCs). Yet another technique for de-embedding the higher-layer compression symbols is to decompress higher layer compression symbols prior to link-layer compression, which may require the network node to have at least some knowledge of the higher layer compression parameters (e.g., history tables, hashing algorithms). Thereafter, the method 500 proceeds to step 560, where the network node reads a known data block from the identified history table entry. Next, the method 500 proceeds to step 570, where the network node compares the incoming data block with the known data block to see if they match. Thereafter, the method 500 proceeds to step 580, where the network node replaces the incoming data block with a link-layer compression symbol to achieve link-layer compression. Thereafter, the method 500 proceeds to step 590, where the network node forwards the compressed traffic flow to the next hop node. In some embodiments, a similar technique may be applied using backward references to achieve link-layer compression, in which case the link-layer compression symbol may identify a position of an earlier instance of the data block within a compressed traffic flow.

Figure 6A:
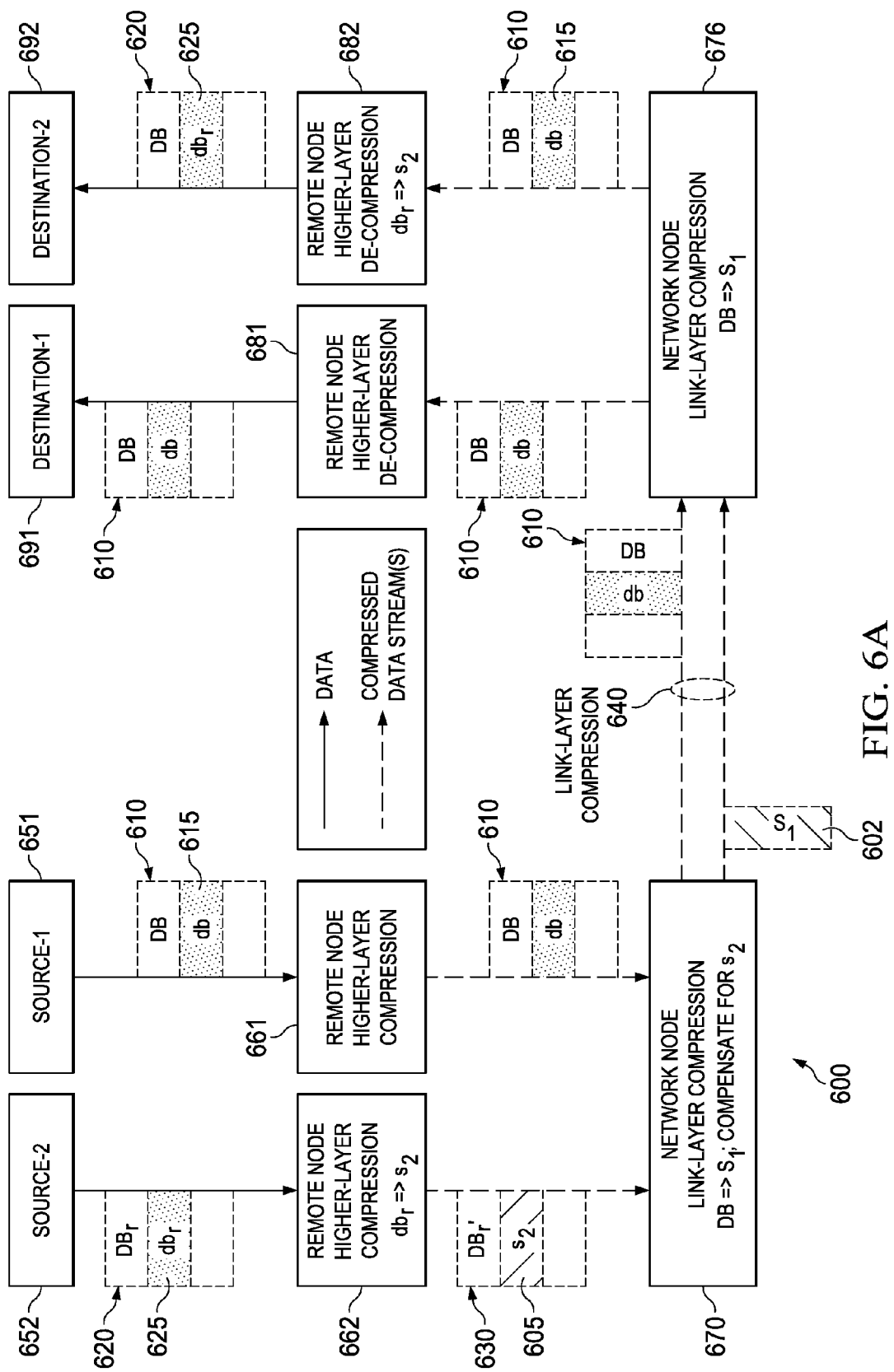
FIGS. 6A-6B illustrate diagrams of embodiment networks for supporting hierarchical compression.

FIG. 6A illustrates an embodiment network 600 configured to support hierarchical compression. As shown, the network 600 includes sources 651, 652, destinations 691, 692, remote nodes 661, 662, 681, 682 configured to perform higher-layer compression, and network nodes 670, 676 configured to perform link-layer compression. In some embodiments, the remote nodes 661, 662, may be co-located with the respective sources 651, 652, and the remote nodes 681, 682 may be co-located at the destinations 691, 692. For example, the sources 651, 652 may be nodes configured to perform higher-layer compression, while the destinations 691, 692 may be configured to perform higher-layer de-compression.

The remote node 661 performs higher-layer compression on a first data stream received from the source 651 to obtain a first compressed data stream, which is forwarded to the network node 670, and then to the network node 676. The higher-layer compression of the first data stream does not alter the data block 610, and consequently the network nodes 670, 676 are able to associate the data block 610 with a link-layer compression symbol ($S_1$). The first compressed data stream is forwarded to the remote node 681, where it is decompressed to re-produce the first data stream, which is forwarded to the destination 691.

The remote node 662 receives a second data stream carrying a redundant data block 620 from the source 652, and performs higher-layer compression on the second data stream to obtain a second compressed data stream.

More specifically, the remote node 662 performs higher-layer compression on the second data stream by replacing a data block portion (db) 625 in the redundant data block 620 with a higher-layer compression symbol ($s_2$) 605. This modifies the data block 610 into a modified data block 630 (depicted as $DB_r'$). The second compressed data stream is then forwarded from the remote node 662 to the network node 670. In this example, the network node 670 is configured to support hierarchical compression, and is therefore able to perform link-layer compression on the second compressed data stream despite its having been modified during higher-layer compression. More specifically, the network node 670 compensates for the higher-layer compression symbol 605 using techniques described herein, and then substitutes the modified data block 630 with a link-layer compression symbol ($S_1$) 602 to achieve link-layer compression and reduce inter-stream redundancies 640 between the first and second compressed data streams. In embodiments, compensating for the higher-layer compression symbol 605 may include adapting the manner in which data chunking is performed, e.g., chunking may be performed around the higher-layer compression symbol 605 to avoid including it within a data chunk. In embodiments, the network node 670 correlates the higher-layer compression symbol ($s_2$) with the data block (db). In other embodiments, the network node 670 compensates for the higher-layer compression symbol ($s_2$) without correlating the higher-layer compression symbol ($s_2$) with the data block (db). For instance, the HASH algorithm may be defined in such a way that the hash of the data block (db) renders the same hash value as a hash of the higher layer compression ($s_2$), in which case the network node 670 can simply apply the hashing algorithm to the data block (DB) 630 without specifically correlating the higher-layer compression symbol ($s_2$) with the data block (db). Performing link-layer compression on the second compressed data stream may produce a compressed traffic flow including the higher-layer compression symbol $S_1$ 602, which is forwarded over the link extending between the network nodes 670 and 676. The network node 676 performs link-layer de-compression on the compressed traffic flow by substituting a copy of the data block 610 for the higher-layer compression symbol $S_1$ 602, thereby obtaining a modified copy of the second compressed data stream, which is forwarded to the remote node 682.

Notably, substituting a link-layer compression symbol for a redundant data block that includes higher-layer compression symbols may obviate the benefits of higher-layer compression unless the higher-layer compression symbols are somehow accounted for at the link-layer. In the network 600 (for example), the modified copy of the second compressed data stream does not include the higher-layer compression symbol $S_2$ 605 because the network node 676 was unaware that the compression symbol was removed during link-layer compression. As such, some of the benefits of higher-layer compression are obviated over the link extending from the network node 676 to the remote node 682, while the link extending from the remote node 662 to the network node 670 still experiences the full benefit of higher-layer compression. This issue can be resolved by embedding the higher-layer compression symbol $s_2$ 602 within the link-layer compression symbol $S_1$ 602 (or within a metadata message carrying the link-layer compression symbol $S_1$ 602), as is discussed in greater detail below. That said, embedding the higher-layer compression symbol within the link-layer compression symbol may increase the length of the link-layer compression symbol, and thereby reduce the amount of compression achieved at the link-layer. For this reason, it may be more efficient from the link-layer's perspective to not embed higher-layer compression symbols within link-layer compression symbols. However, in some embodiments, it may be desirable to maintain end-to-end compression, in which case the embedding the higher-layer compression symbols may be beneficial from the overall network's perspective. In embodiments, the network node may maintain some awareness of the knowledge of future link compression stages, and can utilize this knowledge when deciding to embed the higher layer compression data. For example, the network layer can be aware that the last hop link compressor already knows the UE has this data, and that link compression could remove this chunk again.

Figure 6B:
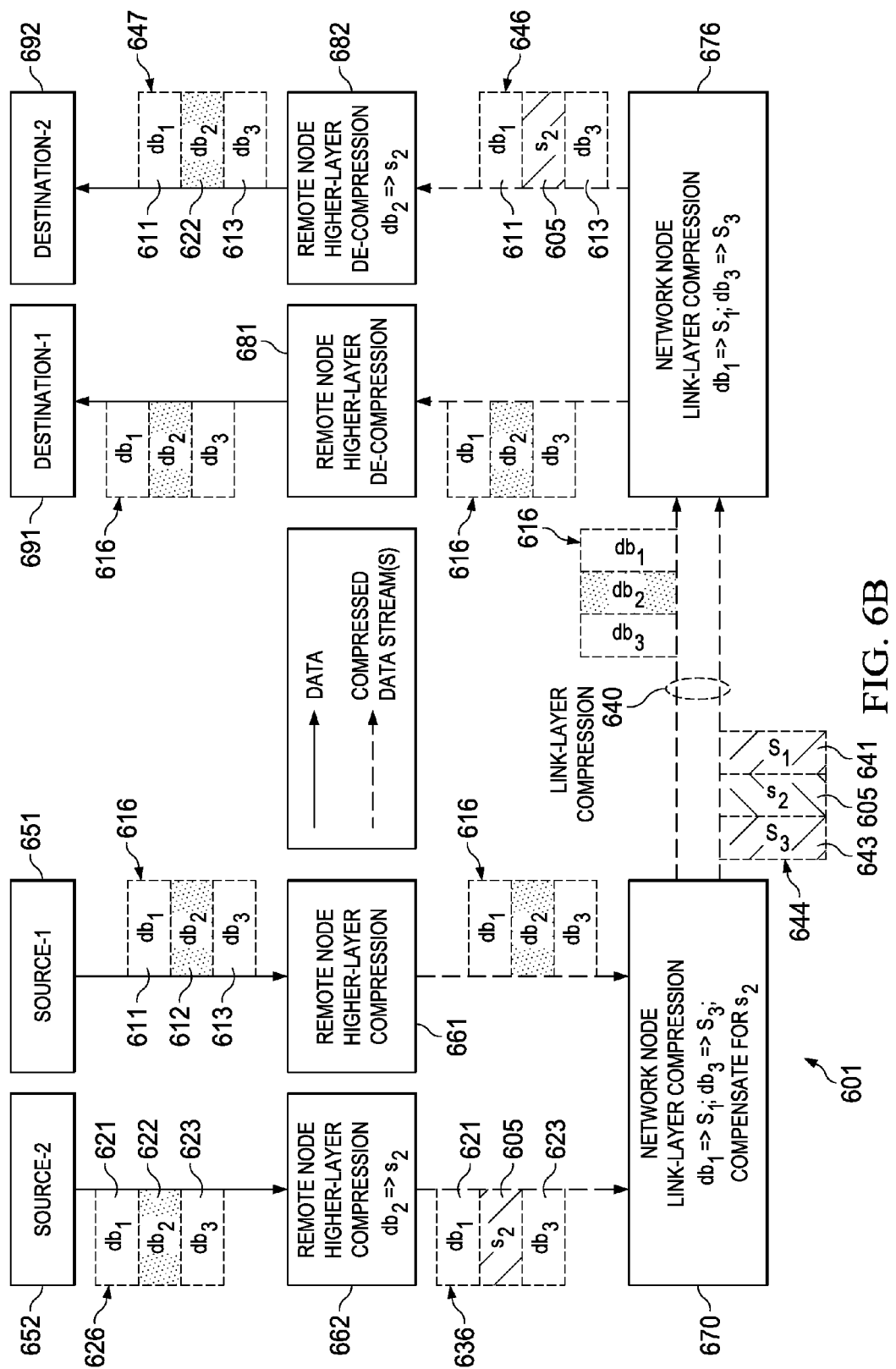

FIG. 6B illustrates an embodiment network 601 configured to support hierarchical compression. The network 601 includes the same components 651-692 as the network 600, although the network nodes 670, 676 are configured to perform link-layer de-compression in a slightly different manner. More specifically, the network nodes 670 is configured to replace redundant strings of data within the second data stream without disturbing higher-layer compression symbols.

As shown, a first data stream carrying the data block 616 is forwarded from the source 651 to the destination 691 via the nodes 661, 670, 676, and 681. The data block 616 carries a first data block portion ($db_1$) 611, a second data block portion ($db_2$) 612, and a third data block portion ($db_3$) 613, and the network nodes 670, 676 associate the first data block portion ($db_1$) 611 with a first link-layer compression symbol ($S_1$) and the third data block portion ($db_3$) with a third link-layer compression symbol ($S_3$).

Moreover, a second data stream carrying a data block 626 is forwarded from the source 652 to the remote node 662. The data block 626 carries a first data block portion ($db_1$) 621, a second data block portion ($db_2$) 622, and a third data block portion ($db_3$) 623. The remote node 662 performs higher-layer compression on the data block 626 by replacing the second data block portion ($db_2$) 622 with a higher-layer compression symbol ($s_2$) 605, thereby modifying the data block 626 into a modified data block 636. The modified data block 636 is then forwarded from the remote node 662 to the network node 670. In this example, the network node 670 is configured to support hierarchical compression, and is therefore able to perform link-layer compression on the modified data block 636 despite its having been modified during higher-layer compression. More specifically, the network node 670 compensates for the higher-layer compression symbol 605 by performing data chucking around that higher-layer compression symbol $s_2$ 605. After the chuncking, the network node 670 determines that the first data block portion ($db_1$) 621 and the third data block portion ($db_3$) 623 are redundant, and replaces the first data block portion ($db_1$) 621 with the first link-layer compression symbol ($S_1$) 641 and the third data block portion ($db_3$) 623 with the third link-layer compression symbol ($S_3$) 643 to obtain the modified data block 644. The modified data block 644 is then forwarded to the network node 676, where link-layer de-compression is performed by substituting data block portions $db_1$, $db_3$ 611, 613 for the higher-layer compression symbols $S_1$, $S_3$ 641, 643 in the modified data block 644 to obtain a modified data block 646. The modified data block 646 is then forwarded to the remote node 682 for higher-layer decompression, where the higher-layer compression symbol ($s_2$) 605 is replaced with the data block portion $db_2$ 622 to obtain the modified data block 647. The modified data block 647 is then forwarded to the destination node 692.

Figure 7:
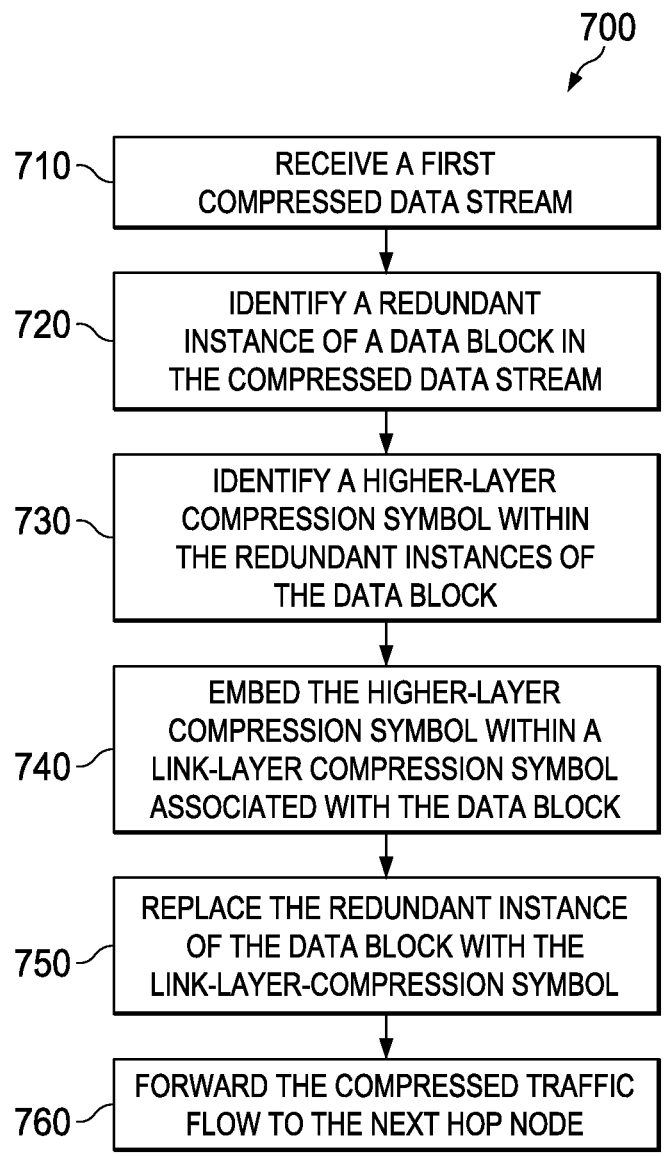
FIG. 7 illustrates a flowchart of another embodiment method for performing link-layer compression.

FIG. 7 illustrates a method 700 for performing link-layer compression with embedded higher-layer compression symbols, as may be performed by a network node. As shown, the method 700 begins with step 710, where the network node receives a compressed data stream. Next, the method 700 proceeds to step 720, where the network node identifies a redundant instance of a data block in the compressed data stream. In some embodiments, the redundant version of the data block may be identified in a manner similar to that described above in the method 500. Thereafter, the method 700 proceeds to step 730, where the network node identifies a higher-layer compression symbol within the redundant instances of the data block. Subsequently, the method 700 proceeds to step 740, where the network node embeds the higher-layer compression symbol within a link-layer compression symbol associated with the data block. Next, the method 700 proceeds to step 750, where the network node replaces the redundant instance of the data block with the link-layer compression symbol. Thereafter, the method 700 proceeds to step 760, where the network node forwards the compressed traffic flow to the next hop node.

Figure 8:
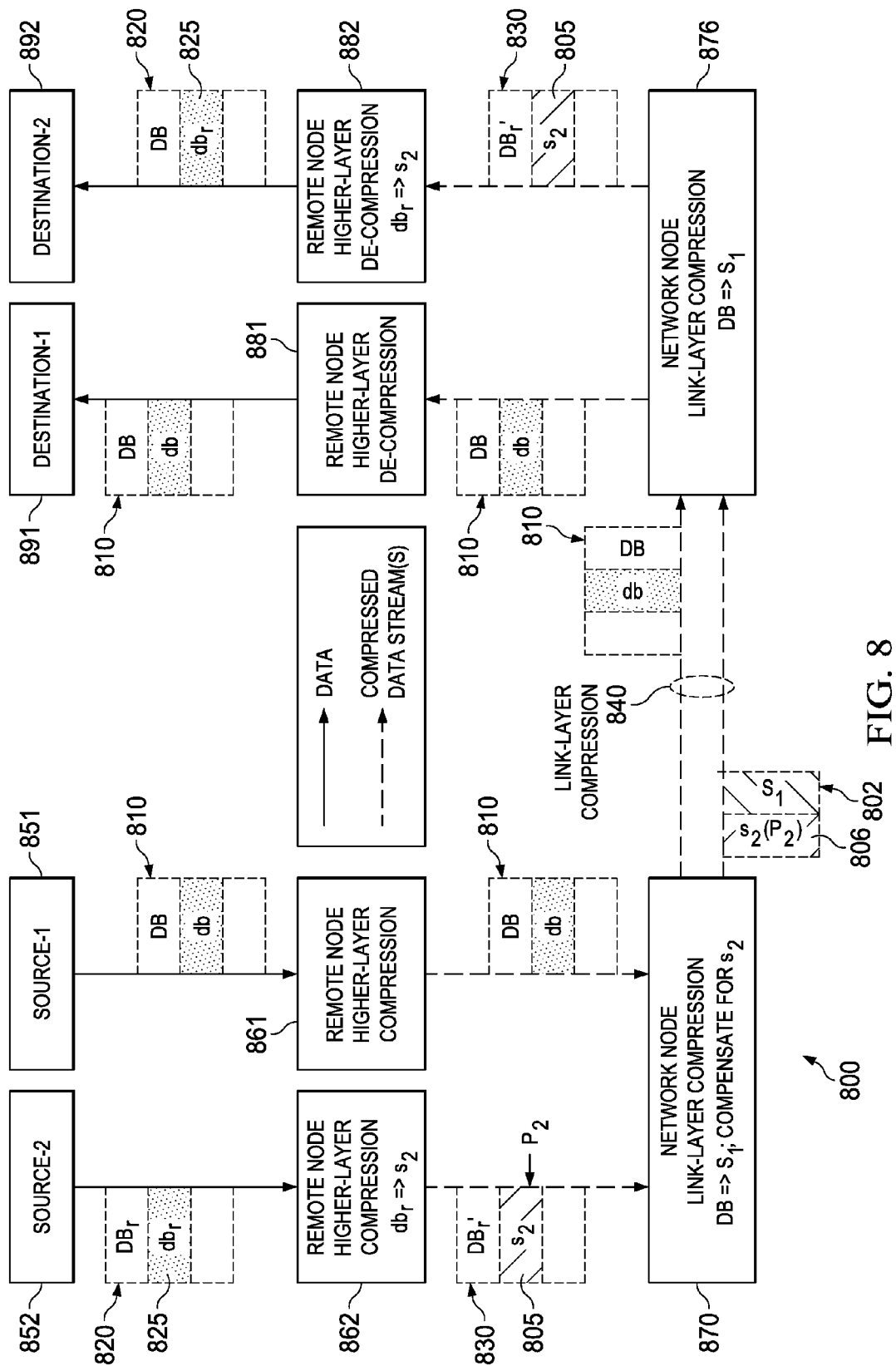
FIG. 8 illustrates a diagram of another embodiment network for supporting hierarchical compression.

FIG. 8 illustrates an embodiment network 800 configured to support hierarchical compression. As shown, the network 800 includes sources 851, 852, destinations 891, 892, remote nodes 861, 862, 881, 882 configured to perform higher-layer compression, and network nodes 870, 876 configured to perform link-layer compression. The sources 851, 852, destinations 891, 892, and remote nodes 861, 862, 881 may be configured similarly to like components in the network 600. For example, a first data stream carrying the first data block 810 from the source 851 to the remote node 861, where it is compressed into a first compressed data stream, and forwarded to the remote node 881 via the network nodes 870, 876. The remote node 881 may decompress the first compressed data stream to re-produce the first data stream, and forward the first data stream to the destination 891. Additionally, the remote node 862 may perform higher-layer compression on a second data stream carrying a redundant data block 820 by substituting a higher-layer compression symbol (s2)

805 for a redundant data block portion (db$_r$) 825, thereby producing a second compressed data stream carrying a modified data block 830.

However, the network node 870 may be configured slightly differently than the network node 670 in the network 600. For example, the network node 870 may embed the higher-layer compression symbol (s2) 805 within a link-layer compression symbol 802 (or within a link-layer metadata message carrying the link-layer compression symbol 802) during link-layer compression 840, thereby allowing the full benefits of higher-layer compression to be experienced over the link extending between the network node 876 and the remote node 882. Moreover, the embedded higher-layer compression symbol 806 may be associated with a position (P2) of the higher-layer compression symbol within the modified data block 830, which may enable the network node 876 to re-produce the modified data block 830 during link-layer de-compression.

Figure 9A:
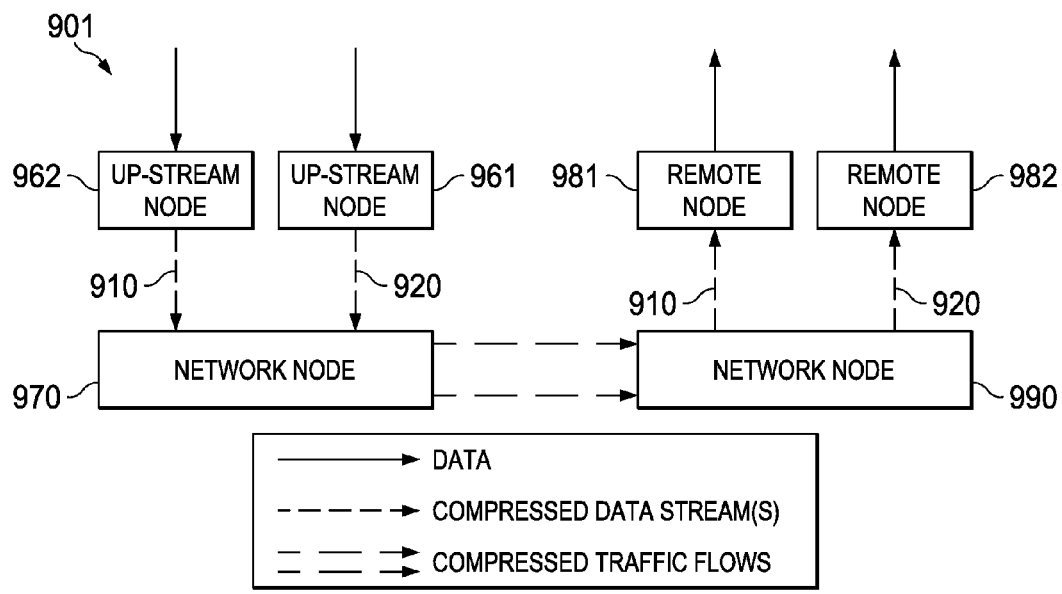
FIGS. 9A-9C illustrate diagrams of embodiment network configurations for supporting hierarchical compression.
Figure 9B:
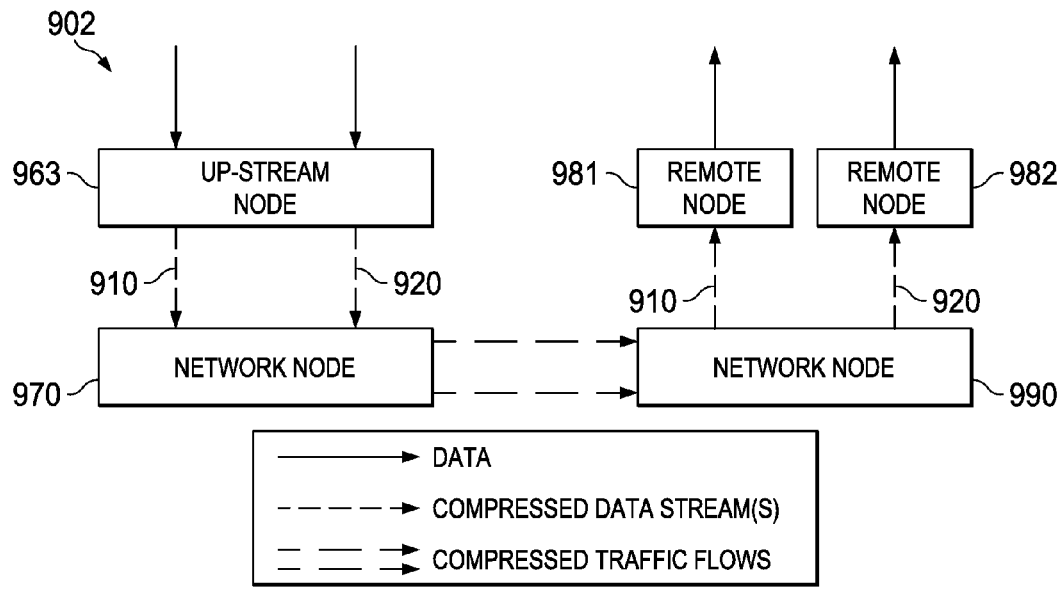
Figure 9C:
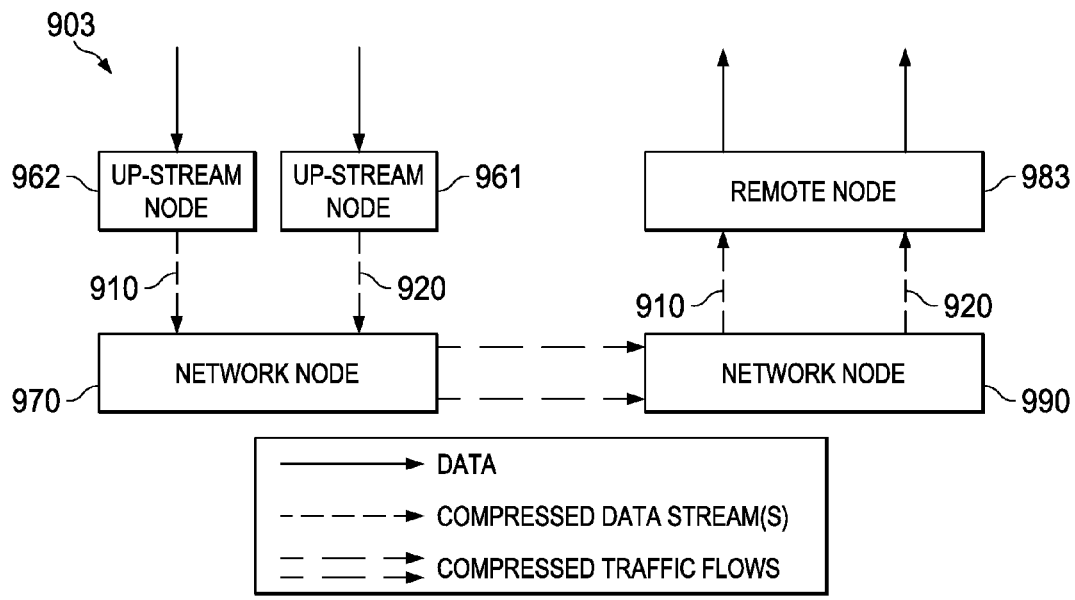

The embodiment hierarchical compression schemes disclosed herein can be applied when compressed data streams originate from the same up-stream node (e.g., source node) or different upstream nodes, as well as when compressed data streams are destined for the same remote node (e.g., destination node) or for different remote nodes. FIGS. 9A-9C illustrate embodiment network configurations 901, 902, 903 for supporting hierarchical compression. As shown in the network configuration 901, a network node 970 is configured to perform link-layer compression on compressed data streams 910, 920 originating from different up-stream nodes 961, 962, and destined for different remote nodes 981, 982. Alternatively, link-layer compression can be performed on compressed data streams 910, 920 originating from the same up-stream node 963, as shown in the network configuration 902. Alternatively, link-layer compression can be performed on compressed data streams 910, 920 destined for the same remote node 983, as shown in the network configuration 903. Other configurations are also covered by the embodiment hierarchical compression schemes provided by this disclosure.

Figure 10:
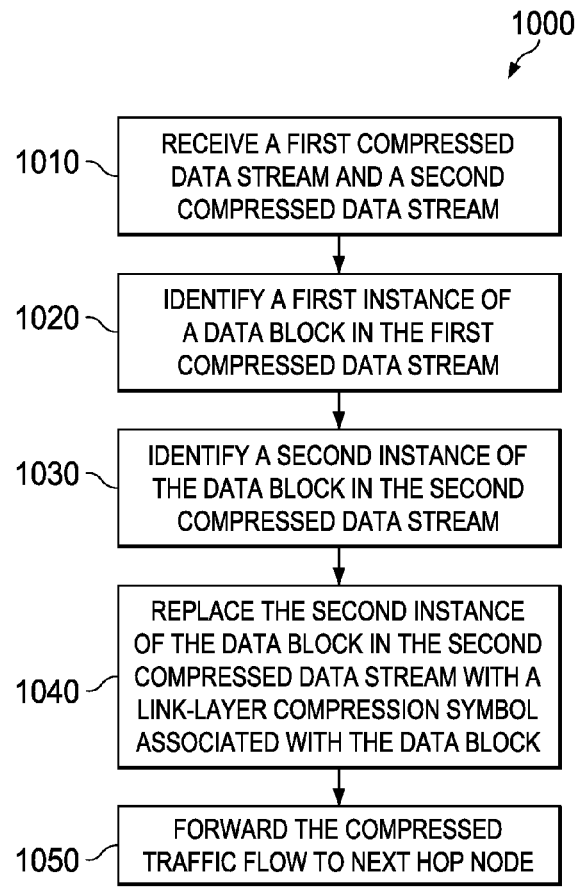
FIG. 10 illustrates a flowchart of an embodiment method for performing link-layer compression on two or more compressed data streams.

Aspects of this disclosure provide embodiment link-layer compression techniques for reducing inter-stream redundancy between two compressed data streams. An original instance of a data block in a first compressed data stream is associated with a link-layer compression symbol at a network node prior to forwarding the first compressed data stream over a link. Thereafter a redundant instance of the data block in a second compressed data stream is substituted for the link-layer compression symbol prior to communicating the second compressed data stream over a link, thereby effectively de-correlating compressed data across different compressed data streams to reduce inter-stream redundancy over the link. As used herein the term "de-correlating" data (compressed or otherwise) refers to reducing redundant data in (or across) data streams. In some embodiments, the link-layer compression symbol is a history table indicator that is associated with the data block at both an upstream network node (e.g., network node performing link-layer compression) as well as a downstream network node (e.g., network node performing link-layer de-compression). In other instances, the link-layer compression symbol is an inter-stream reference identifier (e.g., backward reference identifier) that identifies a location of the original instance of the data block in the first compressed data stream. The link-layer compression symbol may be a link-layer metadata message that includes a history table or inter-stream reference identifier. FIG. 10 illustrates an embodiment method 1000 for performing link-layer compression on two or more compressed data streams, as might be performed by a network node. As shown, the method 1000 begins at step 1010, where the network node receives a first compressed data stream and a second compressed data stream. Next, the method 1000 proceeds to step 1020, where the network node identifies a first instance of the data block in the first compressed data stream. Subsequently, the method 1000 proceeds to step 1030, where the network node identifies a second instance of the data block in the second compressed data stream. Thereafter, the method 1000 proceeds to step 1040, where the network node replaces the second instance of the data block with a link-layer compression symbol associated with the data block. Finally, the method 1000 proceeds to step 1050, where the network node forwards the compressed traffic flow to the next hop node.

Figure 11:
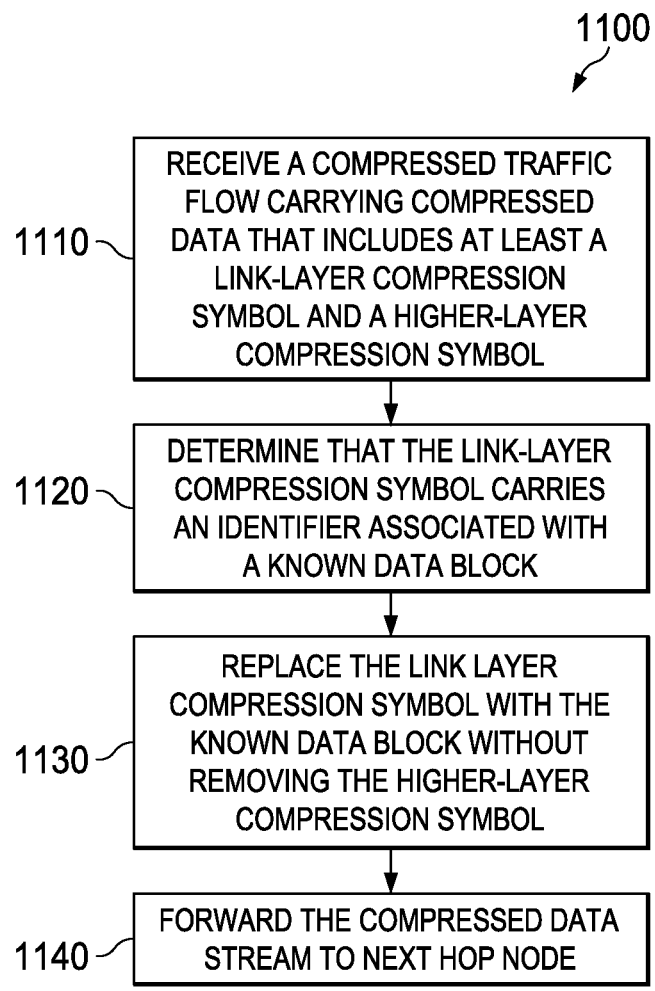
FIG. 11 illustrates a flowchart of an embodiment method for performing link-layer de-compression on a compressed traffic flow.

FIG. 11 illustrates an embodiment method 1100 for performing link-layer de-compression on compressed traffic flow to obtain a compressed data stream, as might be performed by a network node. As shown, the method 1100 begins at step 1110, where the network node receives a compressed traffic flow that includes at least a link-layer compression symbol and a higher-layer compression symbol. Next, the method 1100 proceeds to step 1120, where the network node determines that the link-layer compression symbol is associated with a known data block. Subsequently, the method 1100 proceeds to step 1130, where the network node replaces the link-layer compression symbol with the known data block without removing the higher-layer compression symbol. Replacing the link-layer compression symbol with the known data block may produce a compressed data stream through link-layer de-compression of the compressed traffic flow. Thereafter, the method 1100 proceeds to step 1140, where the network node forwards the compressed data stream to the next hop node.

Figure 12:
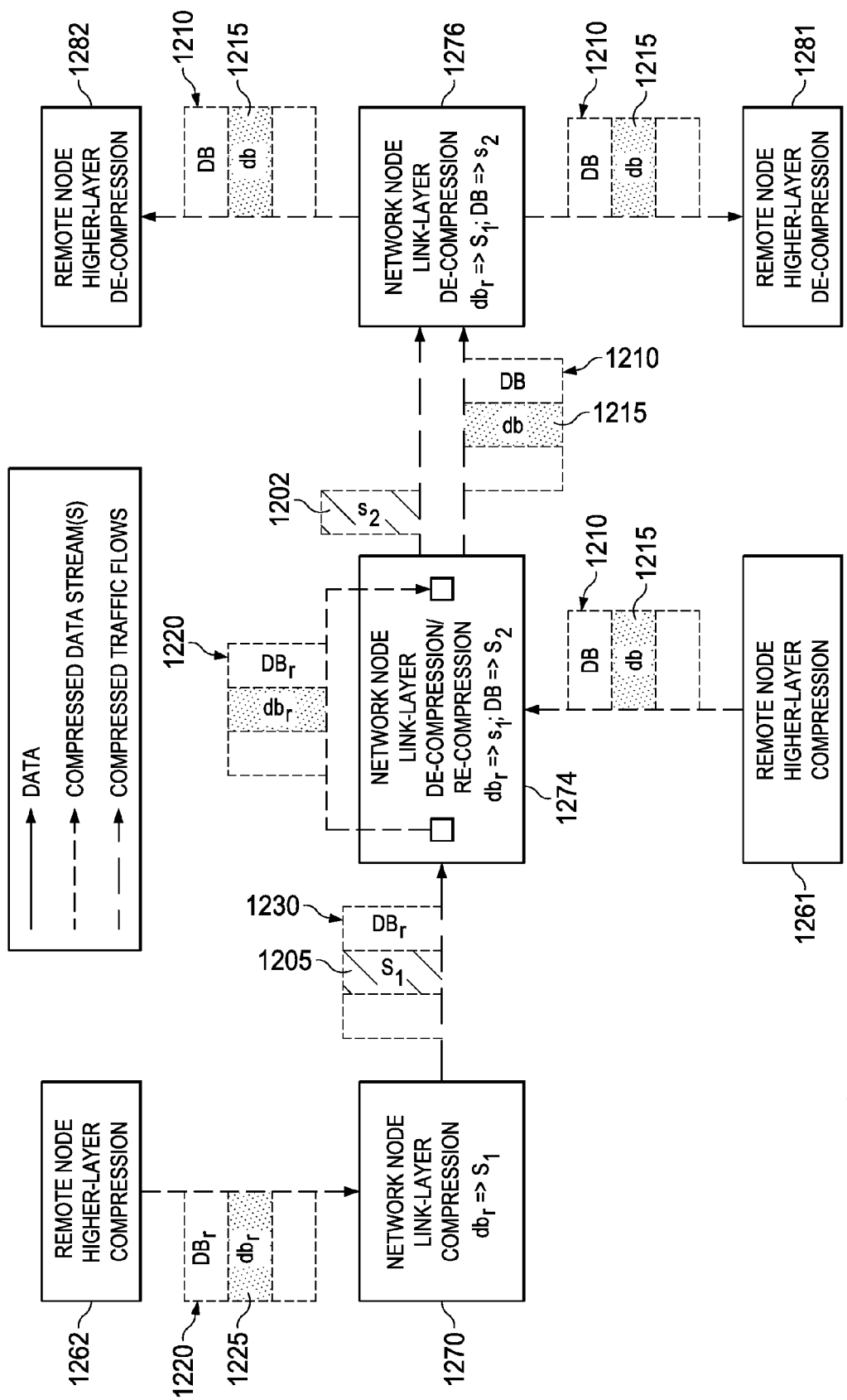
FIG. 12 illustrates a diagram of an embodiment network for supporting hierarchical compression.

In some embodiments, compressed traffic flows are de-compressed and re-compressed (at the link-layer) by intermediate network nodes to achieve further compression. FIG. 12 illustrates an embodiment network 1200 configured to support hierarchical compression. As shown, the network 1200 includes remote nodes 1261, 1262, 1281, 1282 configured to perform higher-layer compression, and network nodes 1270, 1274, 1276 configured to perform link-layer compression. Notably, the network node 1274 may be configured to perform de-compression and recompression on compressed traffic flows received from the network node 1270 to enhance the degree of compression achieved over the link extending between the network nodes 1274 and 1276. Specifically, the network node 1274 receives a compressed media stream from the remote node 1261, and forwards the compressed media stream to the network node 1276, where it is relayed to the remote node 1281. The compressed media stream includes a data block 1210, which is associated with the compression symbol (S$_2$) at the network nodes 1274, 1276. Thereafter, the network node 1270 receives a compressed media stream from the remote node 1262, and compresses the compressed media stream by replacing a data block portion 1225 of a redundant data block 1220 with a compression symbol (s$_1$) 1205, thereby obtaining a compressed traffic flow carrying a modified data block 1230. The compressed traffic flow is forwarded to the network node 1274. The network node 1274 performs link-layer de-compression on the compressed traffic flow to re-produce the compressed media stream, which includes the redundant data block 1220. The redundant data block 1220 is then replaced with the compression symbol S$_2$ 1202 during re-compression, and the resulting compressed traffic flow is forwarded to the network node 1276. The network node 1276 decompresses the compressed traffic flow by replacing the compression symbol $S_2$ 1202 with the data block 1210, and then forwards the resulting compressed media stream to the remote node 1282. In other embodiments, the network node 1274 may embed the compression symbol $s_1$ 1205 within the compression symbol $S_2$ 1202 to preserve higher-layer compression over the link extending between the network node 1276 and the remote node 1282.

Aspects of this disclosure provide schemes in which individual nodes are configured by an external entity. Aspects of this disclosure are applicable to 'software defined routers.' In an embodiment, some or all nodes are capable of applying compression, but may be limited by how much processing power they can devote to it. In such a scenario, it may be important (or otherwise desirable) to apply the correct scheme at the correct place. Aspects of this disclosure provide a method for selecting which compression scheme to apply, which may be broken down into two parts. The first part may consider what can be configured, while the second part may consider how configuration is decided.

Figure 13:
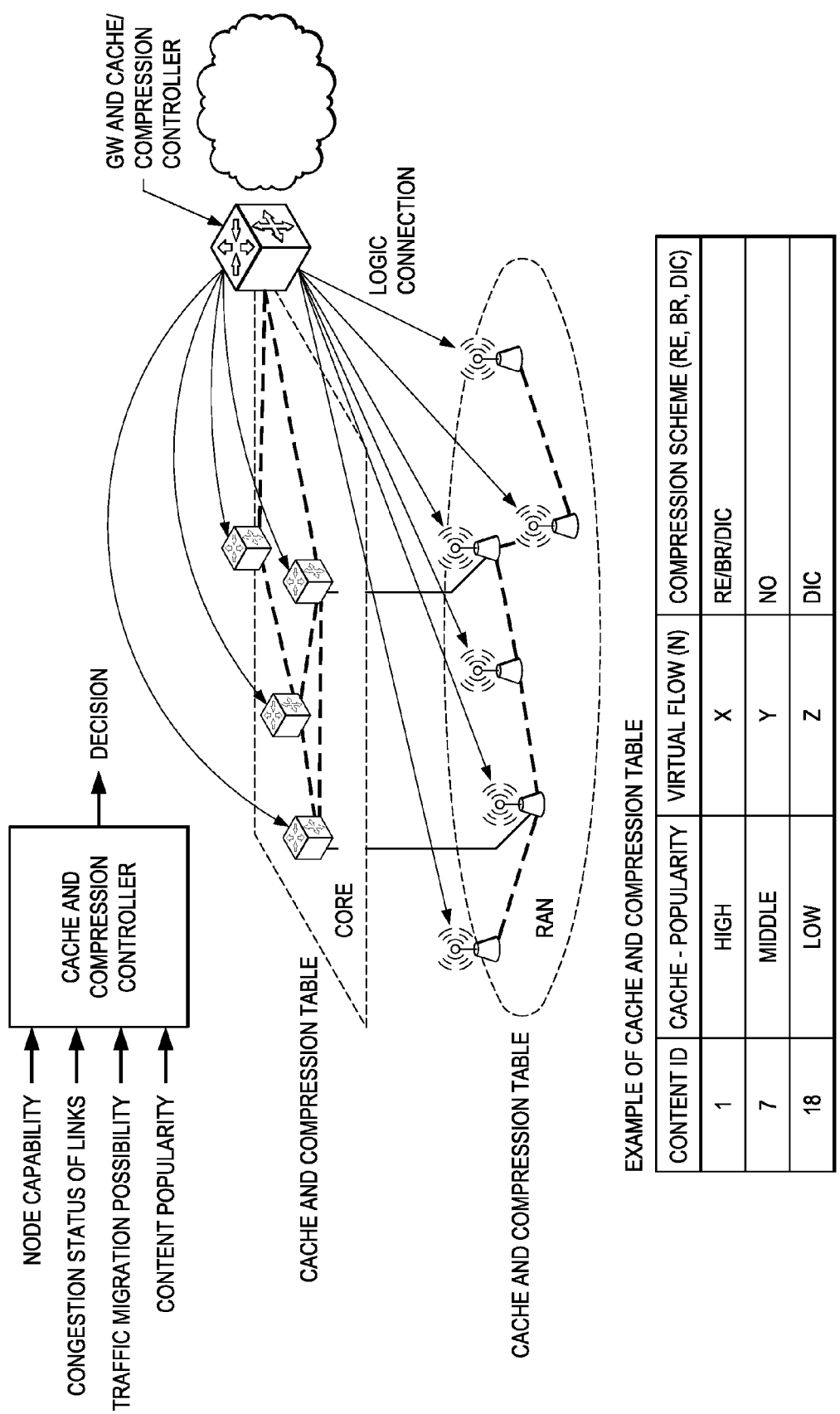
FIG. 13 illustrates a diagram of an embodiment software defined network.

FIG. 13 illustrates an embodiment software defined network for defined cache and compression. In an embodiment, the network may include controllable elements, such as a compression algorithm (and associated parameters) and a compression node pair (e.g., logical compression connection). Each compression algorithm may have unique characteristics (e.g., complexity, compression performance, delay involved, memory required, etc.). In addition, various elements may impact the control decision, including traffic type, quality requirement of traffic/application, mobility, network load/congestion status, node capability (e.g., compression algorithm installed, memory limits, etc.), traffic/content popularity factor, and others. The information elements can be obtained in many ways, for example, network load by logging and collection, traffic type and quality of service (QoS) by service admission control and deep packet inspection (DPI), node capacity by pre-configuration, etc. The decision can be sent to the involved network nodes by a message, e.g., an in-band or out-band message, and the decision algorithm may include various mechanisms for finding a solution, e.g., may indicate to define a utility function based on different performance expectations to find the solutions, etc.

With respect to considering what can be configured: In the above examples it is assumed that compression connections between particular links have already been set up and are predefined. In a software defined network, every node may have the potential to provide compression/de-compression services. Configuration issues may include how much processing power to devote to compression, how the links are designed, which media streams should be compressed, which nodes compression/decompression should occur, the type and amount of de-duplication data to store, how long that data is stored, etc. One approach to addressing these issues may utilize distributed feedback systems to establish/maintain some degree of equilibrium. Alternatively, a centralized control system may be used in which an external entity sets the various parameters involved in compression. A combination of distributed feedback systems and centralized control may also be used.

This disclosure outlines what decisions are to be made, and what parameters are to be set forth by this process. In some embodiments, the compression network may be thought of as a collection of paired compressors/de-compressors. Each pair has a series of parameters defining what they do and how they do it, which are shown in FIG. 14.

In addition to the compressor/de-compressor links, an important element may be the ingress and/or egress router whose job is to perform deep packet inspection and pass information into the system. Note that this element may be contained within internal nodes, rather than within an edge router. The element may be configured with parameters listed in FIG. 15.

With respect to how a configuration decided: In a first embodiment, a central controller may be attached to a central router. In this or other embodiments, a simple extension to a central controller for routers (for example OpenFlow) can be to also configure the compression links. The egress router can monitor traffic flowing through it and estimate achievable compression rates, for different compression schemes. This can be done by random sampling of traffic, along with DPI to determine traffic types etc. This egress router feeds this information to the central controller which takes this into account, along with the capabilities of the various nodes. It then chooses a configuration to try to optimize performance.

Algorithmically speaking, the simplest approach may include a brute force solution in which all compression rates are analyzed, and routing is applied to each to optimize whatever utility the system is trying to maximize (max-min etc.). Other, non-exhaustive, schemes are also possible.

A second embodiment may consider (or otherwise be based on) bottleneck links. Many networks are limited by a small subset of links, which may be identified by having a queue grow on either side of those links. The routers on either side of that link can detect this and begin to initiate compression for traffic flows going across this link. This could be done by the actual links or by a central entity which is monitoring the nodes queues. They would then begin to configure various links upstream and downstream of the link as compressors and de-compressor respectively. A trade off of compression ratio, delay and processing can be adjusted to suit different network configurations.

Hierarchical compression can be applied sequentially, where care is taken to allow for upper layer compression to not interfere significantly with application of lower layer compression. The compression layers may be independent, (yet aware), thus the metadata would have to be indicated in some manner which is distinguishable between the two layers. The role of link decompression is slightly different than usual as it does not need to decompress everything, but rather ensure that the link decompression scheme at the next link is able to decompress the various metadata. It should be noted that the compression/decompression at the final link does not need to be separate. Compressions symbols may include backwards references, dictionary references, and HASH values. In some examples, link-layer compression may ignore higher layer involvement and just run algorithm independently, make sure decompression can be done listlessly, e.g., without decompressing the higher-layer compression symbols. In other examples, link-layer compression may modify metadata to reflect new data so that data can be decoded, e.g., inserting additional data so that the original metadata can be reconstructed. Whether to insert this information or not trades off overhead on the middle links with overhead on the final link. In embodiments, dictionaries (e.g., known HASH values) of the two stages are perfectly synchronized, even if values within those dictionaries are not be identical. Chunks can be replaced with HASH values. The chunk borders should begin/end when any metadata from upper layers is found. This prevents the chunking borders from being affected by higher layer compression. Chunking/HASHing can ignore/remove any inline metadata. If the metadata is stored inline (e.g., if a scheme similar to DEFLATE is used, in which some bytes in the stream indicate the presence (or absence) of metadata), these values may be ignored so that just the payload is used for compression. The indication of metadata may be distinguishable between layers. Otherwise the lower layers may attempt to decompress the higher layer data.

This would at best remove the benefits of redundancy elimination (RE) from the final hop, and at worst create large amounts of 'RE NACK's' as the lower layer dictionary attempts to decode HASH values that it does not necessarily have. The knowledge that the receiver knows this HASH value can be updated. If compression of the metadata is applied, and multiple chunk sizes are present, then additional modifications may be performed. There are many ways to reduce the size of the metadata in RE. If metadata is already present, this could interfere with this compression scheme. Consider the data S=abcdefg, which has hash values abcdefg, where each letter represents a unique chunk of data and each italicized letter represents a hash value. Let us assume that $D_{e2e}$ contains cde and $D_L$ contains the whole stream abcdefg. In standard RE S'=abcdefg, and S"=abcdefg. Thus there is no issue, however if compression was performed then S'=ab $\overline{cde}$ fg, where the accent represents that those indices have been compressed together, if applied independently S"=$\overline{abcdefg}$ this is of course larger than ab $\overline{cdef}$ g where all of the data has been compressed together. To achieve this, the metadata compression could be undone then reapplied across the fields. Note that the overhead of where the original metadata is can be maintained so that the low layer decoder can correctly reconstitute the original signal. Note that if the total size of the metadata is small this additional optimization may be undesirable. If different size chunks are used, it is possible to recognize that the large chunk is in the dictionary, e.g., if the ID in $D_L$ was ab $\overline{cdef}$ g rather than 6 independent ID's then the compression on $\overline{cde}$ could be undone to recognize that this chunk was in the dictionary. Note that if a compression stage exists for the final link some of the additional metadata to ensure good compression on the final link can be removed, trusting that final hop to do this job (for instance if the user has not handed over in a long time, the final hop compression may be as good as end-to-end). Of course this comes at the cost of additional complexity.

In some embodiments, hierarchical compression techniques may use multi-stage backwards references. As a motivating example, let us assume that the data to be sent is a text document, which the link has seen completely before but the end-to-end has not. Because of the redundancy in natural languages there will be many small backwards references within it. The end-to-end would thus generate many small back references. The link compression could replace the whole document with a single back reference. Doing so would remove the compression gains on the last hop. A compression stage on the last link could reapply this compression for links within this document. However it would lose any cross links that it is not aware of (e.g., from outside of the document). This additional back references could be transmitted separately at the cost of additional overhead on the BH which translates into additional gains on the final link. The implementation may depend on the loading/cost of the individual links.

With this multiple link application the question of what a back reference actually refers to can be answered. In some embodiments, the back reference may include a with respect to (wrt) field as discussed in U.S. Non-Provisional patent application Ser. No. 13/828,278 entitled "System and Method for Multi-Stream Compression and Decompression," which is incorporated by reference herein as if reproduced in its entirety. To achieve multi-user compression gains, the back references reference data outside of its own stream. The state of the different streams and what the back references refer to may be updated to reflect changes in the w.r.t. field, or (if the overhead is acceptable) multiple w.r.t. fields may be referenced. Another implementation may allow the back references to be always connected to RE in some way e.g., the back reference may be from a HASH value. Thus as long as no errors occurred between the HASH value and the reference no losses should occur.

In some embodiments, it may be possible to avoid decoding back references at the link-layer by using as 'skip ahead' x bits. For instance the back reference can be an entire text file, along with placement and information in additional metadata for end-to-end compression. The decoder can take the larger back references, and replace the sub portions with the separate metadata.

If known mappings between streams are present (e.g., compressed traffic flow stream is obtained by interleaving two compressed data streams), then the data in the back references can be updated to reflect this with low complexity, e.g., by changing the distance value to reflect new position. If the back references refer to the uncompressed stream, then they can be used without any modifications.

What data is tunneled to what position can have a large impact on complexity and the performance. This decision can be affected by which links are tight, what nodes are busy, and how correlated the data streams are. It may be possible to exchange/update bloom filters between the links when they're not busy.

A tunnel may be interpreted as a destination which is likely to be able to decode this data, the source being guaranteed to be able to decode it. If a packet is moved out of the tunnel, then it can either be decompressed or sent towards another object that is likely to be able to decode it. Note that tunnels can be used for complexity reduction, as some hops along the way may not participate in link-layer compression.

Tunneling is essentially a complexity/memory reduction process. Rather than processing data at a particular node, that data is just forwarded through. This prevents filling node's caches with potentially useless data as well as reduces complexity. The problem of cache size can be considered as an optimization problem. One utility may be maximizing the long term compression ratio or perhaps taking into account the peak traffic times. Let us consider the following scenario. Assume that the compression ratio on the final link can be written as a function that ignores the cost of a first transmission and denotes || as the number of bits expected to be generated by data within that set. With tunneling, the compression ratio may equal (x)|S2|/|Source1|+(1−x)|S1|/|Source2|. Without tunneling, the compression ratio may equal |S1|/|Source| Union Source 21. From these formulas, it can see that if the limitation is in the size of |S1| then tunneling may offer better performance. Considering it's also lower complexity that is good. If the sources are identical then the gains may also be identical, e.g., if the sets S1 and S2 are chosen independently.

Propagating the decompression state backwards. In many cases it may be beneficial to propagate the state of the decompressor back to the source. In practical terms the probably only applies to RE, however back references could also conceivably be applied if they could somehow reference this other link. Consider the following scenario in which two sources both transmit towards the same destination. The BS is fully aware of the state of the de-compressor, but the two gateways (GW) are only aware of the data that goes through them. Because the data going through the two Gateways are different the states of the two encoders will be different. By sending information from BS to the GW, the compression rate can be improved. Assume that the traffic includes a set of elements (Zipf may be a good model for distribution). If an object passes through the BS it is stored in a cache, and compression could occur along either link. The problem is that GW1 only know what passes through GW 1, and not what passes through GW2. Let S1 (S2) be the set of objects that GW 1 (GW 2) knows is in the BS. The set of objects in the BS is S. Some notation and statements about this scenario S⊂S1∪S2 (The set S is in the union of S1 and S2 (if everything is working perfectly this is equality);

$$\frac{|S1 \cap S2|}{|S|} \equiv \text{Corr}$$

(define the correlation as the percent of shared elements); $FL_i$ (forward link i, the link between GW 1 and the BS); $RL_i$ (Reverse link i, the link between the BW and the GW); CL (Cross link, the link between GW1 and GW2). It is possible to determine what should be transmitted back to GW 1 (GW2). The utility metric can be defined as $U=FL_1+FL_2+w_1RL_1+w_2RL_2+w_3CL$.

The savings associated with transmitting an element is equal to the cost of transmitting that element—any metadata required. Let us assume that this amount is a constant c (i.e. constant chunk and metadata size). Thus the gains are ΣProb (element e occurs)c}. The dominant factor here is the probability that this element will be transmitted. Assuming that the traffic from both flows are independent and identically distributed random variables, and that each object is equiprobable, then it is a matter of counting the number of differences between the two. For bloom filters (or stable bloom filters with synchronized deletion) this is a matter of counting the number of ones. The number of elements missing is roughly $$\frac{|S|-|S_i|}{\#\text{Hash}}.$$

Thus given those approximations the gain is easy to calculate. Note that $S_i$ could be maintained at the BS and more accurate measurements are possible. In many situations, the sources may have different distributions. For instance "You-Tube" comes from one direction while, Netflix comes from another. Hence, it may be beneficial to consider how correlated the sources are.

One method would be to measure in the past how often a second copy of an object arrives. This could be done at the receiver (where the receiver keeps track of the objects that arrived in multiple flows), or at the compressor where it keeps track of how often an update helped. Essentially the receiver for each source keeps track of S\S2 for GW 1 and keeps track of how often this set is hit. The probability can then be approximated as $$\text{Prob(element } e \text{ occurs)} \approx \text{Average hit rate in the non-overlap area} = \frac{\#\text{hits to } S\backslash S2}{|S\backslash S2|}.$$

This can be substituted in to calculate the potential gains. Note that if the distribution is heavily weighted in a 'small' number of elements, then the gains from this sharing may be low. Note that this may not be true if conditional probabilities are exploited (e.g., it is known that these objects are associated together, and one of these objects was just accessed) in that case updating the elements around that object may be beneficial. Consider a solution where data is co-located in the past is kept co-located. The assessors for these data's are co-located and loaded from the disk on mass. Rather than load them from the disk (although loading them from the disk may prompt this action), when data is accessed it could push these co-located elements to the nearby sources. Note that this co-located table could already be located at the various sources (maybe they delivered this data way back when.)

The cost of sending that information may depend heavily on how it is done. The raw form would be to send the HASH value directly, e.g., all 160 bits of it. Other methods could also be applied. If the sets are maintained using a variant of bloom filters, then the whole set can be synchronized at a cost of approximately 5|S|(1−corr) bits, or conversely a difference vector can be sent using a golay code of the difference bitmap (i.e. using Golomb codes using m*H(#changes/m) bits). Thus if the correlation is large (difference is small) then only a small update may be sent. Furthermore the same bits used to synchronize GW 1 to S can also be used to synchronize GW 2 to S.

A constant benefit and diminishing/varying cost may be achieved as time goes on. The cost (e.g., loading of the network) can be monitored, and if the cost goes below the perceived benefit, then begin transmission. If the benefits of specific elements of are greater than others then those may be transmitted earlier with higher priority, e.g., using differential/absolute coding. The benefit may be defined as follows:

$$\text{Benifit} = \text{object size} \frac{\#\text{hits to } S\backslash S2}{|S\backslash S2|} - \text{bits per update} * \text{cost of transmission}$$

The bits per update vary from log 2(# of elements)+2 down to 10 bits depending on how many changes have occurred. That means that the hit rate may be roughly 10/object size before updating other nodes makes sense from an equal overhead perspective. If the cost of the network usage is small then updates become more reasonable. If the distribution are approximately Zipf, then propagating back may be unlikely to bring serious gain unless the loading on the network becomes low. If knowledge of the expected symbols increase, then specific updates can be performed.

Some embodiments of this disclosure may be decentralized, in that a combination of many point to point links (e.g., some of which overlap) act independently. Other embodiments, may implement a central controller to determine parameters to be used, manage the compression scheme(s), manipulate the buffer size per user, label flows with traffic types, and recommend compression scheme modifications.

In some embodiments, the hierarchical compression techniques described herein are deployed in a handover situation.

FIG. 16 illustrates an embodiment wireless network configured for hierarchical compression. As shown, a first user equipment (UE1) is handed over to from a first AP (AP1) to a second AP (AP2). In this example, the AP2 may be a relay node such that the link between the AP1 and the AP2 is a wireless interface. Notably, hierarchical compression may be used to achieve improved compression over the wireless interface extending between AP1 and AP2.

Figure 17:
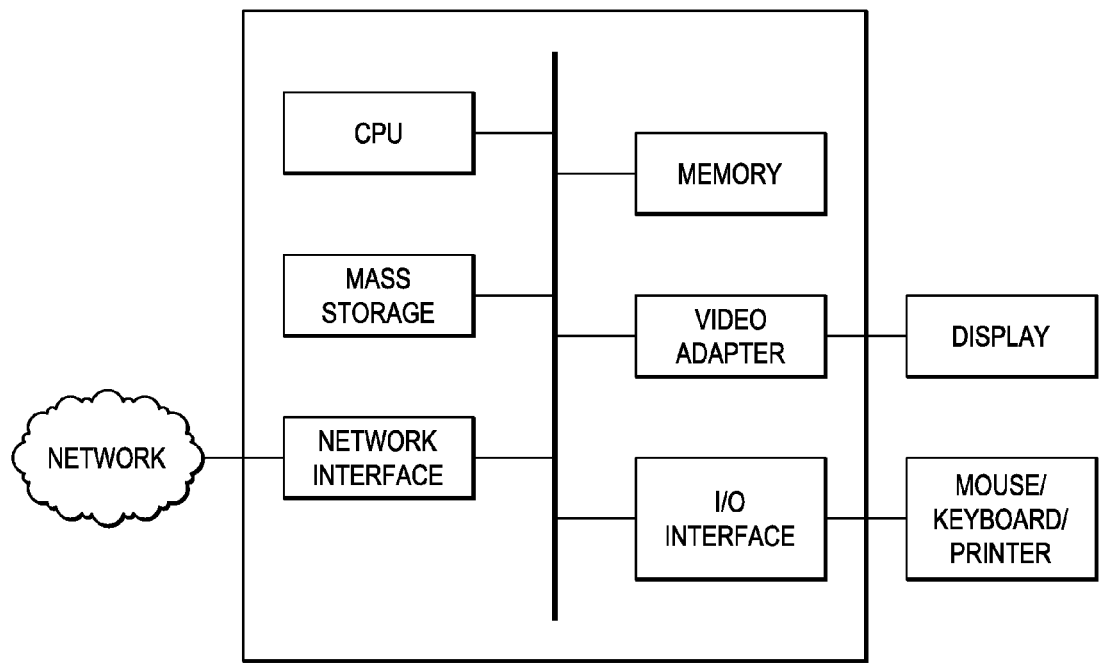
FIG. 17 illustrates a block diagram of a computing platform.

FIG. 17 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer. It will be understood by those skilled in the art that many implementations of the above described embodiments will not require the presence of a video or direct I/O interface. The absence of such interfaces should not be seen as an unintended implementation, as a video adapter and I/O interface are purely optional components.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for compressing data over a link, the method comprising:
  receiving a first compressed data stream and a second compressed data stream at a network node, the second compressed data stream being generated through higher-layer compression of a data stream at an upstream node;
  identifying a first occurrence of a data block in the first compressed data stream;
  performing link-layer compression on at least the second compressed data stream to obtain a compressed traffic flow, wherein performing link-layer compression on at least the second compressed data stream comprises identifying a second occurrence of the data block in the second compressed data stream, and replacing the second occurrence of the data block in the second compressed data stream with a link-layer compression symbol associated with the data block, the first compressed data stream being a different data stream than the second compressed data stream; and
  forwarding the compressed traffic flow from the network node to a next hop node on the link.

2. The method of claim 1, wherein the link-layer compression symbol is an identifier associated with the data block in a history table.

3. The method of claim 1, wherein performing link-layer compression on at least the second compressed data stream to obtain a compressed traffic flow comprises:
  performing link-layer compression on both the first compressed data stream and the second compressed data stream to obtain the compressed traffic flow.

4. The method of claim 3, wherein the link-layer compression symbol is a backwards or forwards reference identifier that identifies a position of the first occurrence of the data block in the first compressed data stream.

5. The method of claim 3, wherein performing link-layer compression on both the first compressed data stream and the second compressed data stream to obtain the compressed traffic flow comprises:
  de-correlating compressed data in the second compressed data stream with compressed data in the first compressed data stream to reduce inter-stream redundancy between the second compressed data stream and the first compressed data stream.

6. The method of claim 5, wherein the first compressed data stream and the second compressed data stream are addressed to different remote nodes.

7. The method of claim 5, wherein the first compressed data stream and the second compressed data stream originate from different source nodes.

8. The method of claim 1, wherein the compressed traffic flow is configured to be decompressed through link-layer de-compression at a downstream network node positioned on the link, and
  wherein the second compressed data stream is configured to be decompressed through higher-layer de-compression at a remote node, the next hop node being positioned in-between the network node and the remote node.

9. The method of claim 1, wherein identifying the second occurrence of the data block in the second compressed data stream comprises:
- identifying higher-layer compression symbols in the second compressed data stream, the higher-layer compression symbols having been inserted into the second compressed data stream by the upstream node during higher-layer compression;
- identifying a data chunk as a string of data positioned in-between a first higher-layer compression symbol and a second higher-layer compression symbol; and
- determining that the data chunk is associated with the second occurrence of the data block.

10. The method of claim 9, wherein the link-layer compression symbol includes an indicator that differentiates the link-layer compression symbol from the higher-layer compression symbols.

11. The method of claim 1, wherein the second occurrence of the data block includes an intermediate higher-layer compression symbol.

12. The method of claim 11, wherein replacing the second occurrence of the data block in the second compressed data stream with a link-layer compression symbol associated with the data block comprises:
- embedding the intermediate higher-layer compression symbol within the link-layer compression symbol, the embedded intermediate higher-layer compression symbol being associated with a position of the intermediate higher-layer compression symbol within the second occurrence of the data block; and
- replacing the second occurrence of the data block with the link-layer compression symbol.

13. An apparatus comprising:
a processor; and
a non-transitory computer readable storage medium storing programming for execution by the processor, the programming including instructions to:
- receive a first compressed data stream and a second compressed data stream at a network node, the second compressed data stream having been generated through higher-layer compression of a data stream at an upstream node;
- identify a first occurrence of a data block in the first compressed data stream;
- perform link-layer compression on at least the second compressed data stream to obtain a compressed traffic flow, wherein the instructions to perform link-layer compression on at least the second compressed data stream include instructions to identify a second occurrence of the data block in the second compressed data stream, and to replace the second occurrence of the data block in the second compressed data stream with a link-layer compression symbol associated with the data block, the first compressed data stream being a different data stream than the second compressed data stream; and
- forward the compressed traffic flow from the network node to a next hop node on the link.

14. The apparatus of claim 13, wherein the instructions to perform link-layer compression on at least the second compressed data stream to obtain a compressed traffic flow include instructions to:
- perform link-layer compression on both the first compressed data stream and the second compressed data stream to obtain the compressed traffic flow, wherein the link-layer compression symbol is a backwards or forwards reference identifier that identifies a position of the first occurrence of the data block in the first compressed data stream.

15. The apparatus of claim 13, wherein the instructions to perform link-layer compression on at least the second compressed data stream to obtain a compressed traffic flow include instructions to:
- perform link-layer compression on both the first compressed data stream and the second compressed data stream to obtain the compressed traffic flow by de-correlating compressed data in the second compressed data stream with compressed data in the first compressed data stream to reduce inter-stream redundancy between the second compressed data stream and the first compressed data stream.

16. The apparatus of claim 15, wherein the first compressed data stream and the second compressed data stream are addressed to different remote nodes.

17. The apparatus of claim 15, wherein the first compressed data stream and the second compressed data stream originate from different source nodes.

18. The apparatus of claim 13, wherein the compressed traffic flow is configured to be decompressed through link-layer de-compression at a downstream network node positioned on the link, and
wherein the second compressed data stream is configured to be decompressed through higher-layer de-compression at a remote node, the next hop node being positioned in-between the network node and the remote node.

19. The apparatus of claim 13, wherein the instructions to identify the second occurrence of the data block in the second compressed data stream include instructions to:
- identify higher-layer compression symbols in the second compressed data stream, the higher-layer compression symbols having been inserted into the second compressed data stream by the upstream node during higher-layer compression;
- identify a data chunk as a string of data positioned in-between a first higher-layer compression symbol and a second higher-layer compression symbol; and
- determine that the data chunk is associated with the second occurrence of the data block.

20. The apparatus of claim 19, wherein the link-layer compression symbol includes an indicator that differentiates the link-layer compression symbol from the higher-layer compression symbols.

21. The apparatus of claim 13, wherein the second occurrence of the data block includes an intermediate higher-layer compression symbol.

22. The apparatus of claim 21, wherein the instructions to replace the second occurrence of the data block in the second compressed data stream with a link-layer compression symbol associated with the data block include instructions to:
- embed the intermediate higher-layer compression symbol within the link-layer compression symbol, the embedded intermediate higher-layer compression symbol being associated with a position of the intermediate higher-layer compression symbol within the second occurrence of the data block; and
- replace the second occurrence of the data block with the link-layer compression symbol.

23. A method for link-layer de-compression, the method comprising:
- receiving, by a network node, a compressed traffic flow from an upstream network node, the compressed traffic flow carrying compressed data that includes at least a first link-layer compression symbol and a first higher-layer compression symbol; and performing, by the network node, link-layer de-compression on the compressed traffic flow to obtain a compressed data stream, wherein performing link-layer de-compression comprises determining that the first link-layer compression symbol is associated with a first data block, and replacing the link-layer compression symbol with the first data block, wherein the higher-layer compression symbol remains in the compressed data after the link-layer de-compression.

24. The method of claim 23, wherein the link-layer compression symbol was inserted into the compressed data during link-layer compression at an upstream network node, and wherein the higher-layer compression symbol was inserted into the compressed data during higher-layer compression at a source node.

25. The method of claim 24, further comprising:
forwarding the compressed data stream to a remote node.

26. The method of claim 24, further comprising:
performing, by the network node, link-layer re-compression on at least the compressed data stream to obtain a new compressed traffic flow, wherein performing link-layer re-compression on at least the compressed data stream comprises identifying a redundant occurrence of a second data block in the compressed data stream, and replacing the redundant occurrence of the second data block with a second link-layer compression symbol associated with the second data block; and
forwarding the new compressed traffic flow to a next hop node.

27. The method of claim 26, wherein performing link-layer compression on at least the compressed data stream further includes re-substituting the first link-layer compression symbol for the first data block.

28. The method of claim 26, wherein the redundant occurrence of the second data block includes a data string encompassing the first data block, and wherein performing link-layer compression on at least the compressed data stream includes inserting the second link-layer compression symbol into the compressed data without inserting the first link-layer compression symbol into the compressed data.

29. The method of claim 28, wherein the higher-layer compression is lossless, and wherein the link-layer compression is lossy.

30. An apparatus comprising:
a processor; and
a non-transitory computer readable storage medium storing programming for execution by the processor, the programming including instructions to:
receive a compressed traffic flow from an upstream network node, the compressed traffic flow carrying compressed data that includes at least a first link-layer compression symbol and a first higher-layer compression symbol; and
perform link-layer de-compression on the compressed traffic flow to obtain a compressed data stream, wherein the instructions to perform link-layer de-compression include instructions to determine that the first link-layer compression symbol is associated with a first data block, and replacing the link-layer compression symbol with the first data block, wherein the higher-layer compression symbol remains in the compressed data after the link-layer de-compression.

31. A method for compressing data over a link, the method comprising:
receiving, by a network node, a compressed data stream, the compressed data stream having been generated through higher-layer compression of a data stream at an upstream node;
identifying higher layer compression symbols in the compressed data stream;
performing data chunking in-between the higher layer compression symbols during link-layer compression to obtain one or more data chunks, wherein the data chunks and at least a first one of the higher layer compression symbols are positioned in a compressed data block of the compressed data stream;
determining that the one or more data chunks match known data chunks of a known data block;
comparing the compressed data block with the known data block to determine if the compressed data block matches the known data block;
substituting a link-layer compression symbol for the compressed data block if the compressed data block matches the known data block, thereby obtaining a compressed traffic flow; and
forwarding the compressed traffic flow from the network node to a next hop node on the link.

32. The method of claim 31, wherein substituting the link-layer compression symbol for the compressed data block comprises:
embedding the first higher layer compression symbol in the link-layer compression symbol; and
replacing the compressed data block with the link-layer compression symbol.

33. A network node comprising:
a processor; and
a non-transitory computer readable storage medium storing programming for execution by the processor, the programming including instructions to:
receive a compressed data stream, the compressed data stream having been generated through higher-layer compression of a data stream at an upstream node;
identify higher layer compression symbols in the compressed data stream;
perform data chunking in-between the higher layer compression symbols during link-layer compression to obtain one or more data chunks, wherein the data chunks and at least a first one of the higher layer compression symbols are positioned in a compressed data block of the compressed data stream;
determine that the one or more data chunks match known data chunks of a known data block;
compare the compressed data block with the known data block to determine if the compressed data block matches the known data block;
substitute a link-layer compression symbol for the compressed data block if the compressed data block matches the known data block, thereby obtaining a compressed traffic flow; and
forward the compressed traffic flow from the network node to a next hop node on the link.

* * * * *